April 23, 1968

S. V. CHELMINSKI 3,379,273

POWERFUL SOUND IMPULSE GENERATION
METHODS AND APPARATUS

Filed Nov. 12, 1963

INVENTOR.
STEPHEN V. CHELMINSKI

BY
Curtis, Morris and Safford
ATTORNEYS

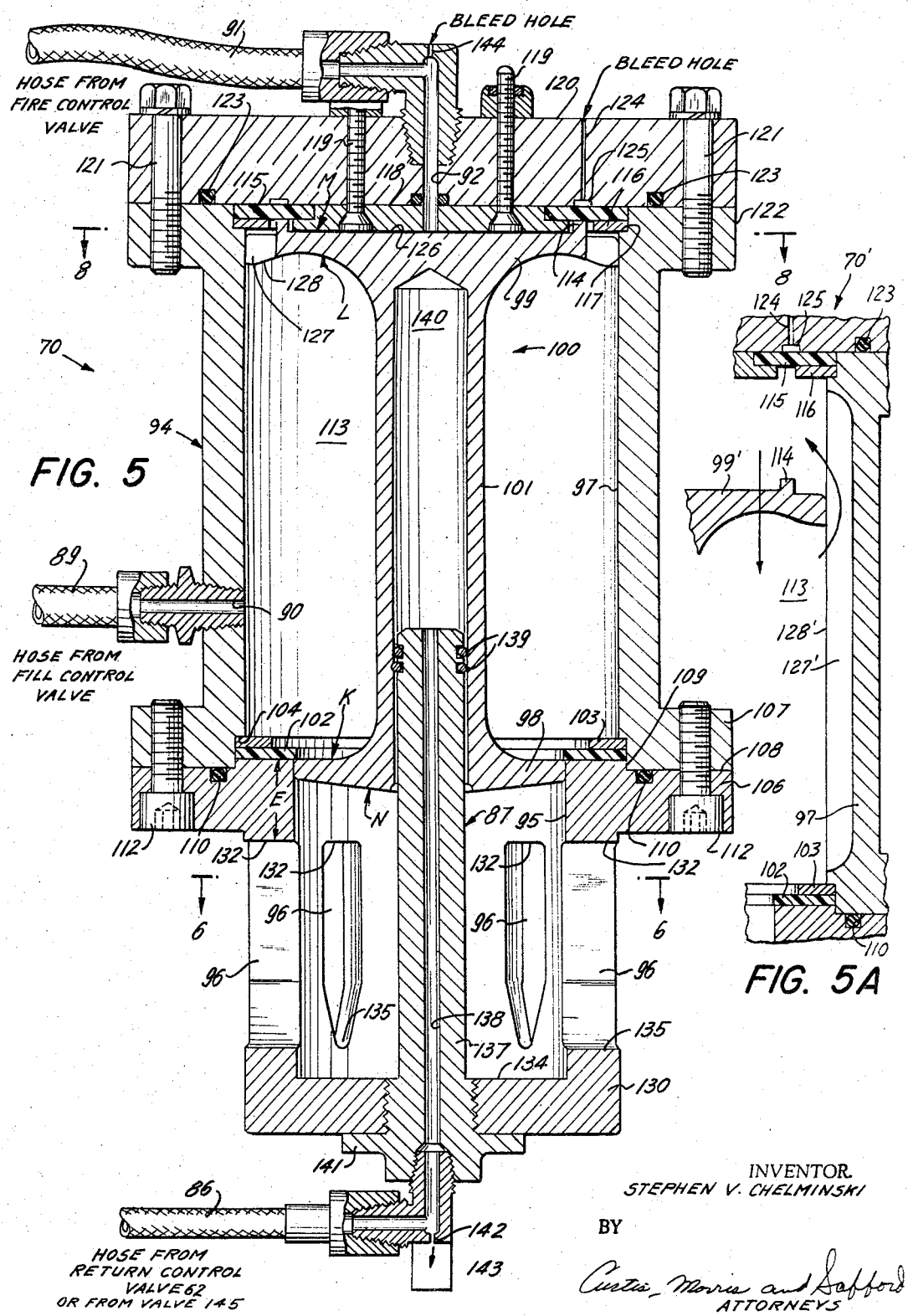

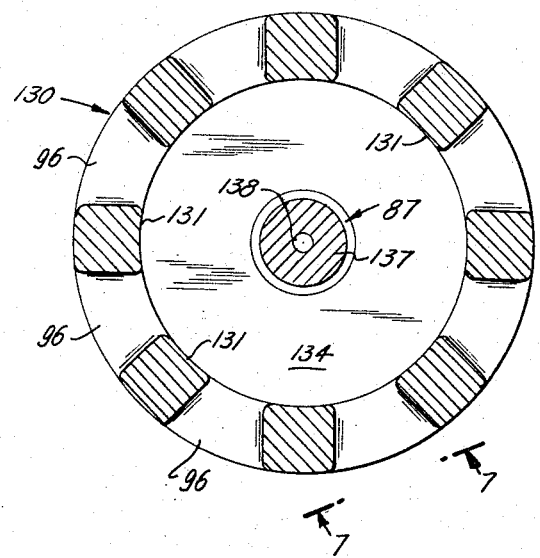
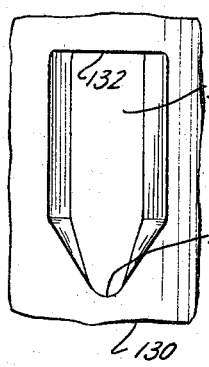
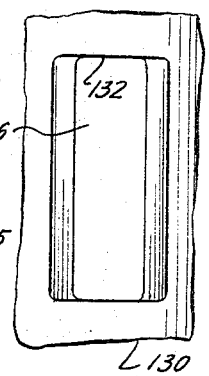
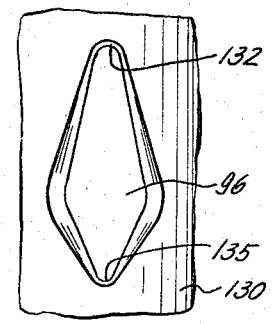
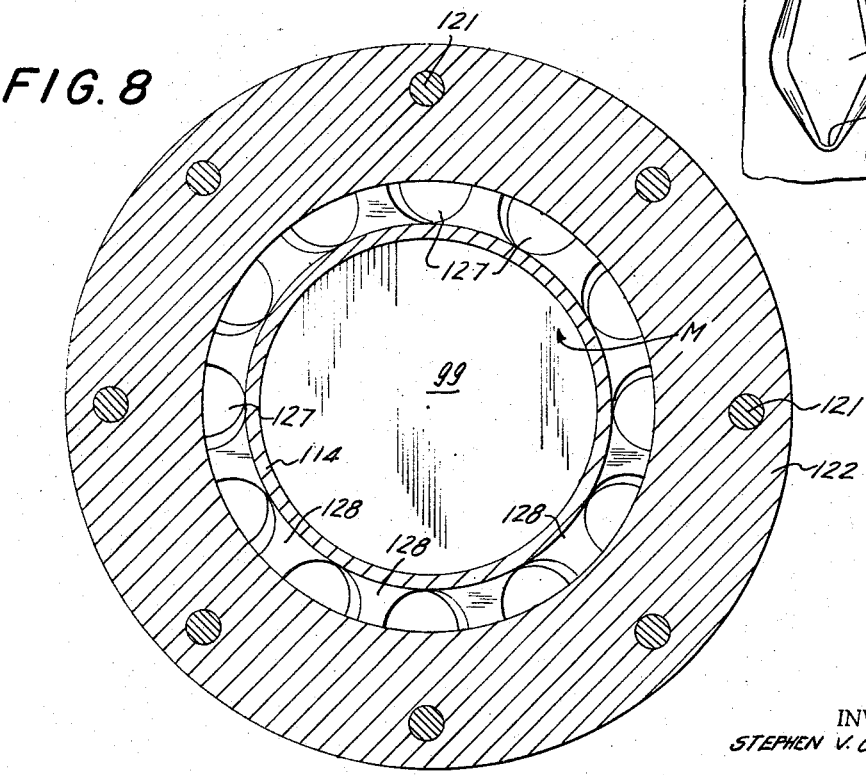
INVENTOR.
STEPHEN V. CHELMINSKI

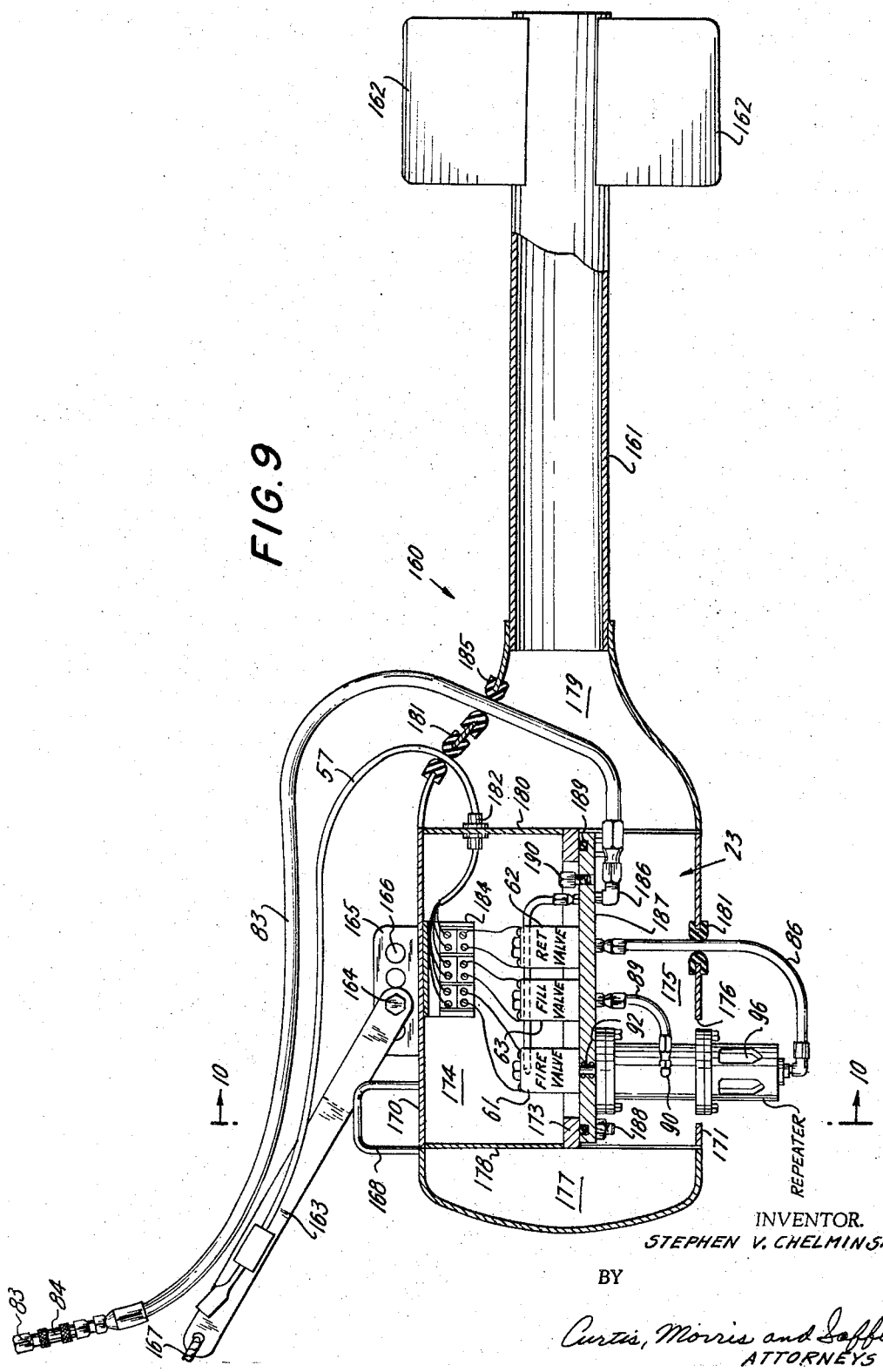

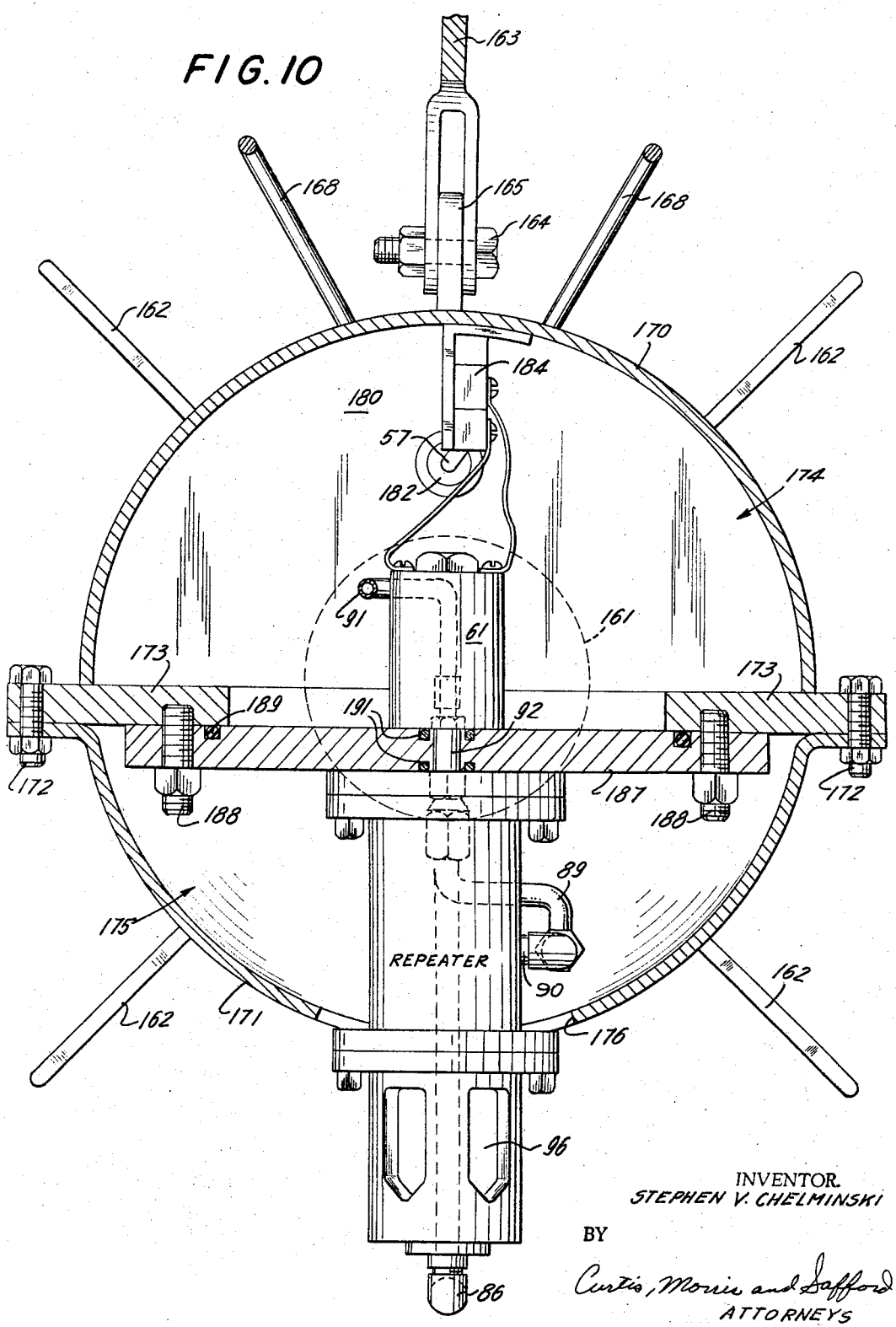

FIG.11
FIG.13
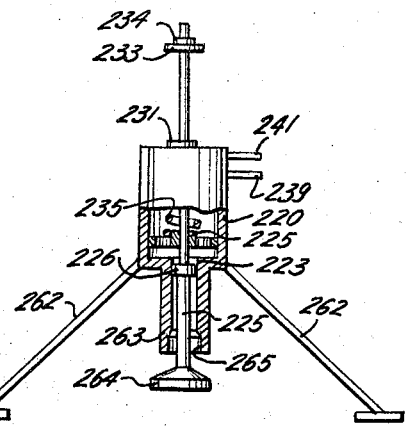
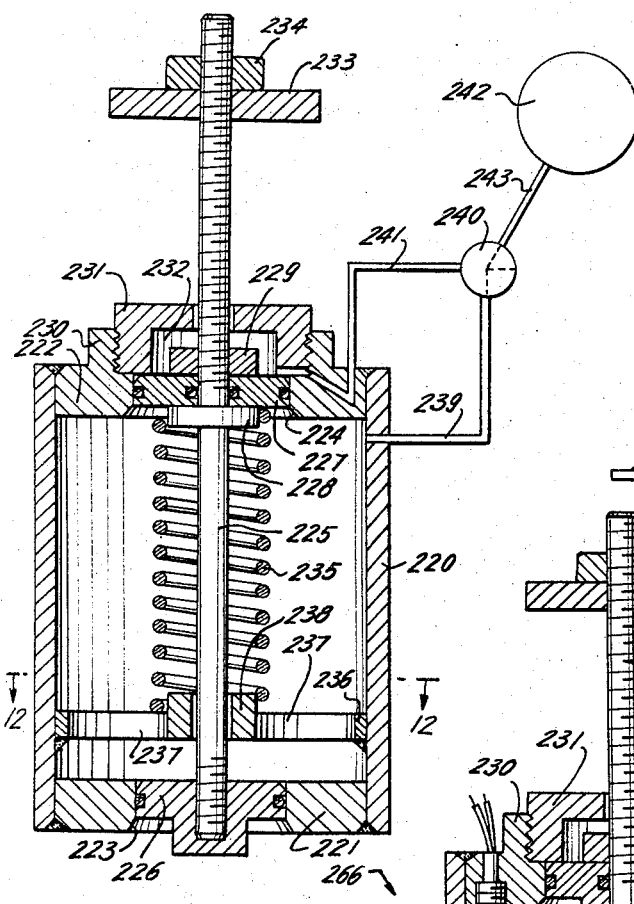
FIG.14
FIG.12
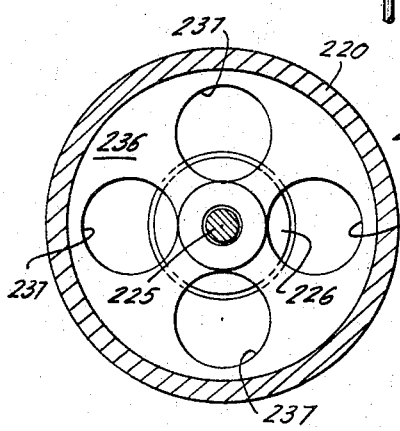

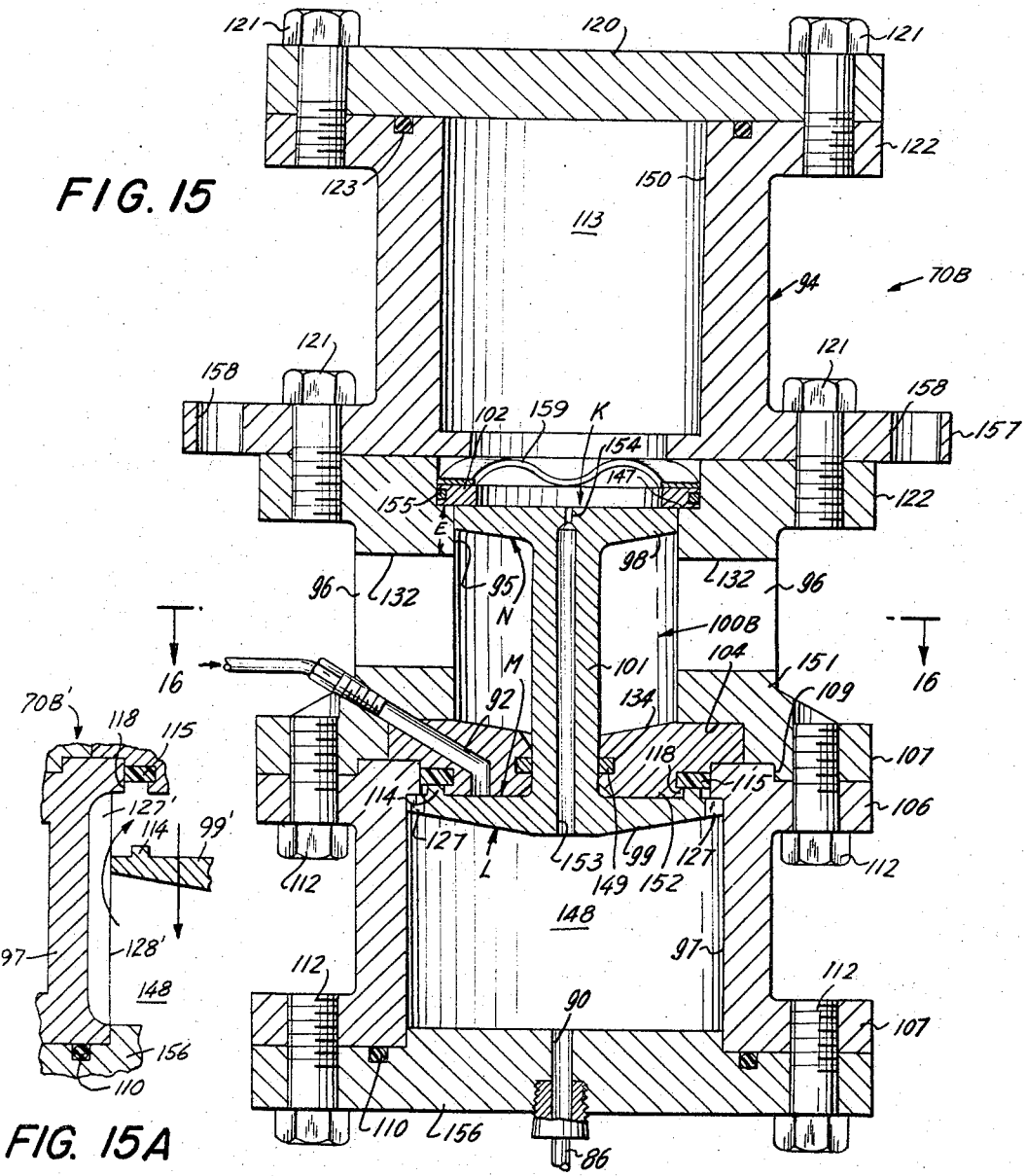
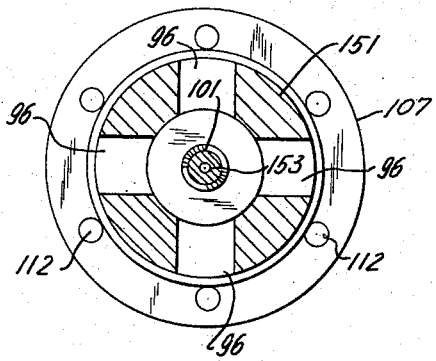

April 23, 1968
S. V. CHELMINSKI
3,379,273
POWERFUL SOUND IMPULSE GENERATION
METHODS AND APPARATUS
Filed Nov. 12, 1963
12 Sheets-Sheet 11
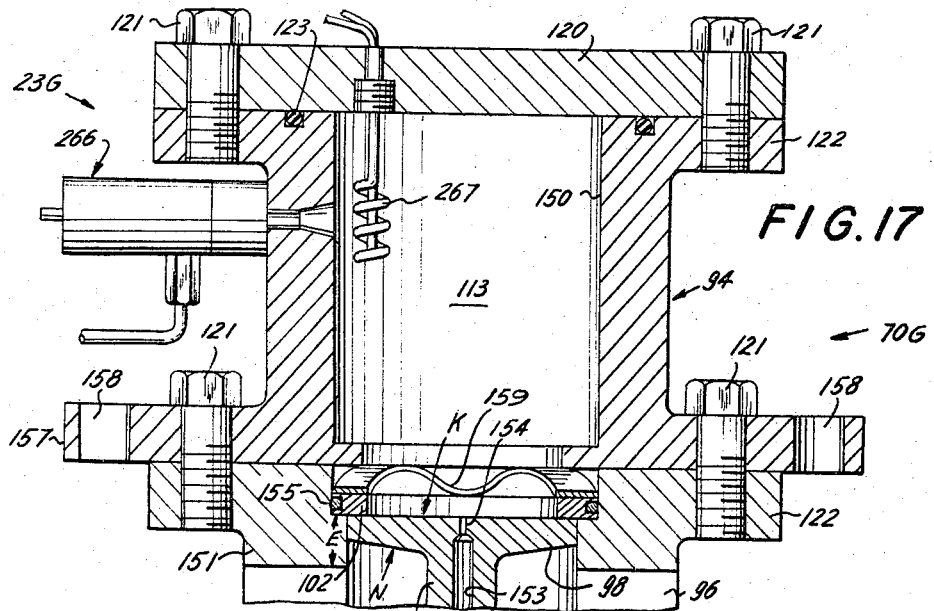
FIG. 17
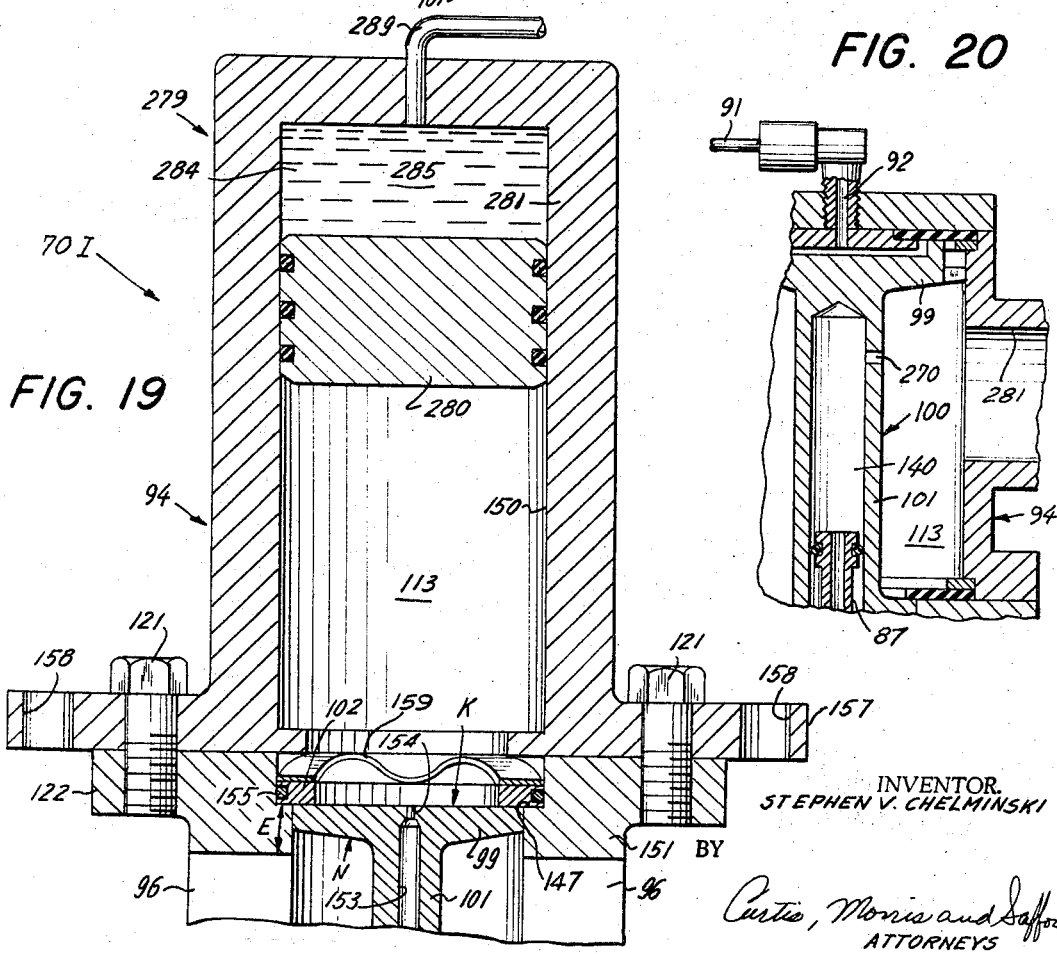
FIG. 19
FIG. 20
INVENTOR.
STEPHEN V. CHELMINSKI
BY Curtis, Morris and Safford
ATTORNEYS

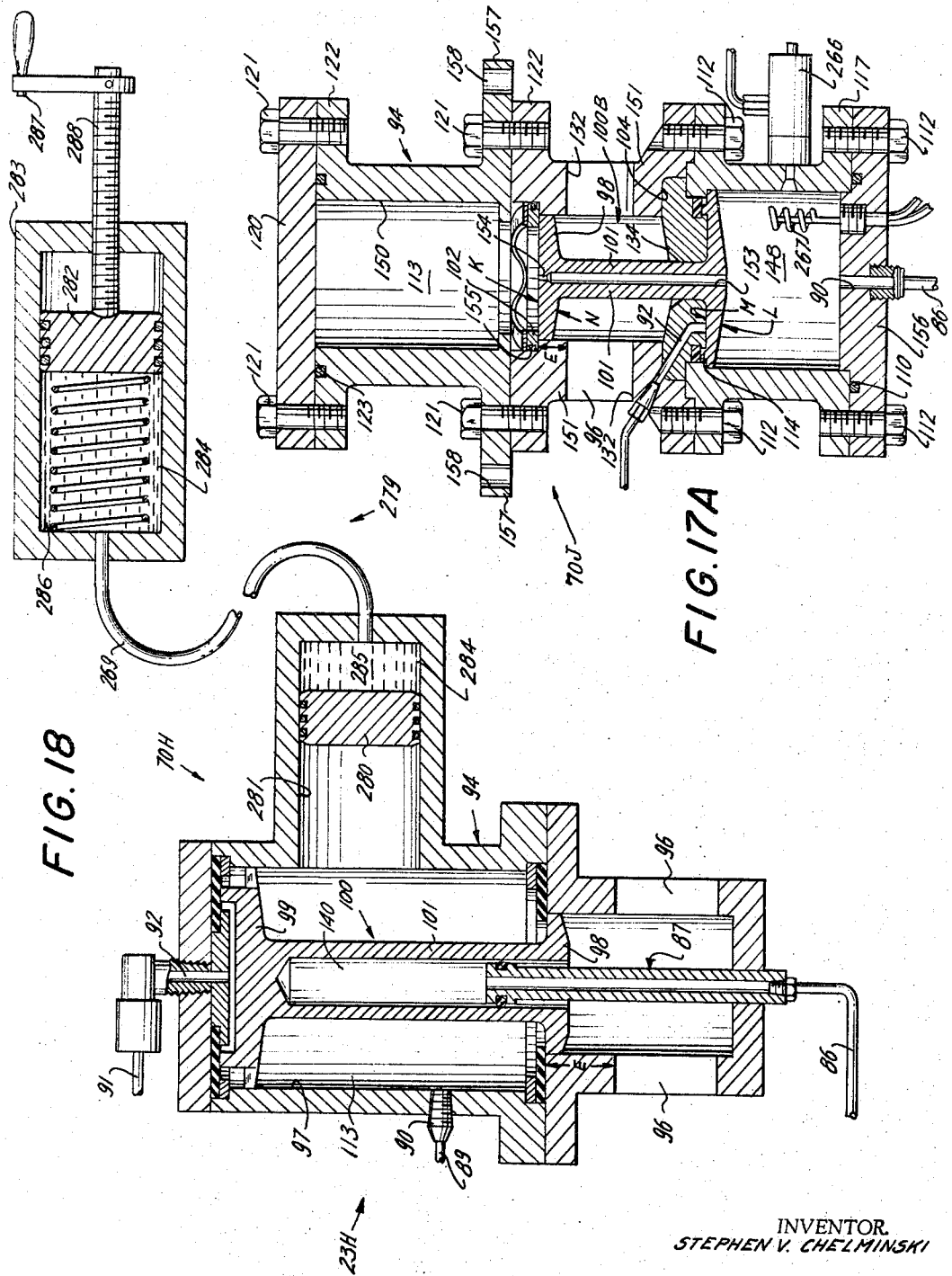

United States Patent Office 3,379,273
Patented Apr. 23, 1968

3,379,273
POWERFUL SOUND IMPULSE GENERATION METHODS AND APPARATUS
Stephen V. Chelminski, Redding, Conn., assignor to Bolt Associates, Inc., East Norwalk, Conn.
Continuation-in-part of application Ser. No. 151,853, Nov. 13, 1961. This application Nov. 12, 1963, Ser. No. 322,677
28 Claims. (Cl. 181—.5)

ABSTRACT OF THE DISCLOSURE

Methods and systems generating and utilizing powerful acoustical waves produced underwater, useful for reflection or refraction types of seismic surveys or for combinations of these. Compressed air fed to acoustical impulse generator apparatus is confined therein, electrical signals produced for firing to suddenly release the confined compressed air generating powerful acoustical waves. The pressure of compressed air is applied for re-closing the confined volume, to confine air again to repeat the sudden release; the amplitude and frequency spectrum characteristics of the acoustical waves may be varied; and in certain embodiments fuel is burned in the confined air, raising the pressure before release. Various embodiments of high-velocity shuttle configurations, pneumatic shuttle-return means, by-pass passages, seals, movable spring-biased seals, valve means, shapes of discharge vents, chamber arrangements, and electrical firing circuits are shown. Automatic firing arrangements are disclosed for self-firing without electrical signals, and a towing chassis unit with tail boom and fins is disclosed.

This application is a continuation-in-part of my prior copending application Ser. No. 151,853, filed on Nov. 13, 1961, which issued on May 3, 1966, as Patent No. 3,249,177.

The present invention relates to powerful sound impulse generation methods and apparatus and relates to the art of sound instrumentation, and particularly to a new and improved pneumatic acoustical repeater and to methods and apparatus utilizing the impulses including seismic exploration systems utilizing powerful sound impulses generated underwater.

Among the many advantages of the sound impulse generation methods and apparatus which are described herein as illustrative of the present invention are those resulting from the fact that an abrupt and clear-cut sound impulse is produced and is readily repeatable as desired. These powerful sound impulses are useful for many purposes, for example, a sharply-defined powerful "boom" is produced underwater and having a high intensity and penetrating ability for seismic exploration. Moreover, the sound impulse generation methods and apparatus of the present invention enable the use of compressed air for generating a powerful sound impulse underwater and enable the powerful sound impulse to be repeated conveniently at frequent and accurately timed intervals, for example, such as once every two seconds and in many cases at shorter intervals if desired, from a single acoustical impulse generator, also referred to herein as an "acoustical repeater." In addition, this sound impulse generator can be operated for long periods of time, for example, for a day, while continuously producing powerful sound impulses at these frequent intervals. The compressed air is utilized to advantage in effectuating its own sudden release in response to an electric trigger signal.

The methods and apparatus of the present invention enable seismic exploration surveys to be made of the conditions and characteristics of the bottom and sub-bottom formations beneath bodies of water and of objects in the water and of shoreline conditions and characteristics either from or to a moving vessel or from or to a stationary vessel, including aircraft and lighter-than-air craft. Also, the powerful sound impulses enable either reflection or refraction types of seismic surveys to be made and also combinations of these types of surveys. These powerful sound impulses are adapted for transmission over long distances horizontally through the water as well vertically and are adapted to be conducted long distances in one or more geological formations or strata and to emerge at one or various points distant from the place of entry, thus providing information about characteristics of the stratum or strata involved. There is an initial period of time during which the compressed gas is retained under substantially full pressure and then an abrupt transition to the full release of this air so as to create an abrupt and clear-cut powerful sound impulse.

Among the further advantages of the powerful sound impulse generation methods and apparatus described herein are those resulting from the fact that the seismic sound generator unit, acoustical repeater, as described is adapted to build up and store energy in the form of compressed air within the unit underwater. A powerful sound impulse is generated by suddenly and abruptly releasing this compressed air directly into the water as desired, thus creating a strong sharply-defined acoustic wave having high penetrating ability. A relatively high efficiency of acoustic wave generation is provided by virtue of the fact that the compressed air acts directly upon the surrounding body of water, as compared with the efficiency of exploding gas systems which explode gas from ambient pressure or the efficiency of the electrical type of systems wherein the electrical energy is converted to heat energy and/or to chemical energy to expand and/or to dissociate or electrolyse the water or is converted to electromagnetic forces which in turn are used to move masses for the generation of sound.

While the methods and apparatus of the invention are applicable for many purposes as will be set forth further below, they are illustratively disclosed and described as applied to underwater sound instrumentation such as oceanographic equipment and systems that are employed in seismic exploration of the world's crust under and adjacent to bodies of water.

Since water is such a good sound conductor, it is unnecessary to generate sound waves right on or in the ocean floor; they can be produced in the water near the surface. The pressure waves travel down through the water to the ocean floor and are reflected as in the usual echo-sounding techniques. However, these waves also penetrate into the ocean floor and are reflected from the substrata. These acoustic waves propagate horizontally through one or more geological strata and may be recorded at a distance from the source, thus providing useful refraction data on the stratum or strata involved.

While explosives for marine seismic work can put large amounts of energy into the water and obtain great depth of penetration, they do have drawbacks; they are dangerous to handle and use, and in some areas such as congested harbors, they cannot be used at all. Also, each "shot" costs money which can run into many thousands of dollars per survey. Explosives tend generally to concentrate substantial amounts of their energy output into higher frequency components which may not be desirable for many purposes; whereas, the sound impulse generation methods and apparatus of the present invention can be adjusted over a large amplitude range and adjusted in frequency so as to provide the desired spectrum distribution of sound frequencies for the purposes at hand. The methods and apparatus of the present invention provide a great flexibility in operation; the sound intensity and characteristics can be conveniently adjusted by adjusting the pressures and volumes of compressed air being released.

The present invention is illustratively described as embodied in a device capable of emitting a large amount of acoustical energy into water in the form of a clear, repeatable pulse, the frequency and amplitude of which may be readily varied. These powerful sound impulses are well adapted for use in seismic exploration systems and also can be used to advantage for other purposes.

It is an object of the present invention to improve the methods and apparatus for powerful underwater sound impulse generation.

A further object of the present invention is to provide improved seismic exploration and survey systems.

Another object of the present invention is to improve the art of seismic exploration and surveying of the earth beneath bodies of water and the seismic exploration and surveying of the earth near bodies of water.

A further object of the present invention is to improve the methods and apparatus for the convenient sudden release of gases underwater or in other fluid media for the generation of strong, well-defined acoustic waves and pressure waves for a wide variety of useful applications as described further below.

Among the many objects of the present invention is to provide an acoustical repeater by which a large amount of sound energy can be produced with a relatively small device, and to provide a pneumatic acoustical repeater which is convenient and safe to use for a wide variety of functions and purposes and providing a power source for tools and machines to shape and form materials and objects, to punch and shear materials and objects, and to loosen, heave and dislodge mineral deposits. As used herein the term "acoustical repeater" is intended to include acoustical impulse generator repeaters which may be operated with gases supplied thereto or under high pressure or generated therein under high pressure and including compressed air as well as other gases as may be desirable in various applications. In most instances compressed air is used, but it is to be understood that the term "acoustical repeater" is not intended to be limited to air-operated apparatus, as will be pointed out in the detailed description further below.

The various objects, aspects and advantages of the present invention will be in part more fully pointed out and in part will be understood from a consideration of the following specification in conjunction with the accompanying drawings, in which:

FIGURES 3 and 4 show modified acoustical impulse generation systems adapted for use in seismic exploration systems similar to that shown in FIGURE 1;

FIGURE 5 is an elevational sectional view of an acoustical repeater which may be used in these systems;

FIGURE 5A is a partial sectional view showing a modification of the apparatus of FIGURE 5;

FIGURE 6 is a cross sectional view of the pneumatic acoustical repeater of FIGURE 5 taken along the line 6—6 of FIGURE 5;

FIGURES 7, 7A and 7B are elevational views showing vent openings of different configurations;

FIGURE 8 is a sectional view taken along the line 8—8 of FIGURE 5 looking down;

FIGURE 9 is an axial sectional view of seismic sound impulse generator repeater apparatus adapted to be used in surveying and exploration systems such as those shown in FIGURES 1–4;

FIGURE 10 is a cross section of FIGURE 9 taken along the line 10—10 in FIGURE 9 and looking back;

FIGURE 11 illustrates a modified pneumatic acoustical repeater which may be used in the foregoing systems;

FIGURE 12 is a cross section of FIGURE 11 taken along line 12—12 of FIGURE 11; and FIGURES 13 through 20 inclusive show further modified acoustical repeater apparatus which may be used in the foregoing systems. FIGURE 15A is a partial sectional view showing a modification of the apparatus of FIGURE 15. The apparatus shown in FIGURES 14 and 17 are adapted to have fuel injected therein; the apparatus shown in FIGURES 18 and 19 are adapted to have their effective volume controlled and adjusted remotely while the apparatus are submerged in use; and FIGURE 17A is another modification adapted to have fuel injected therein.

Figure 1:
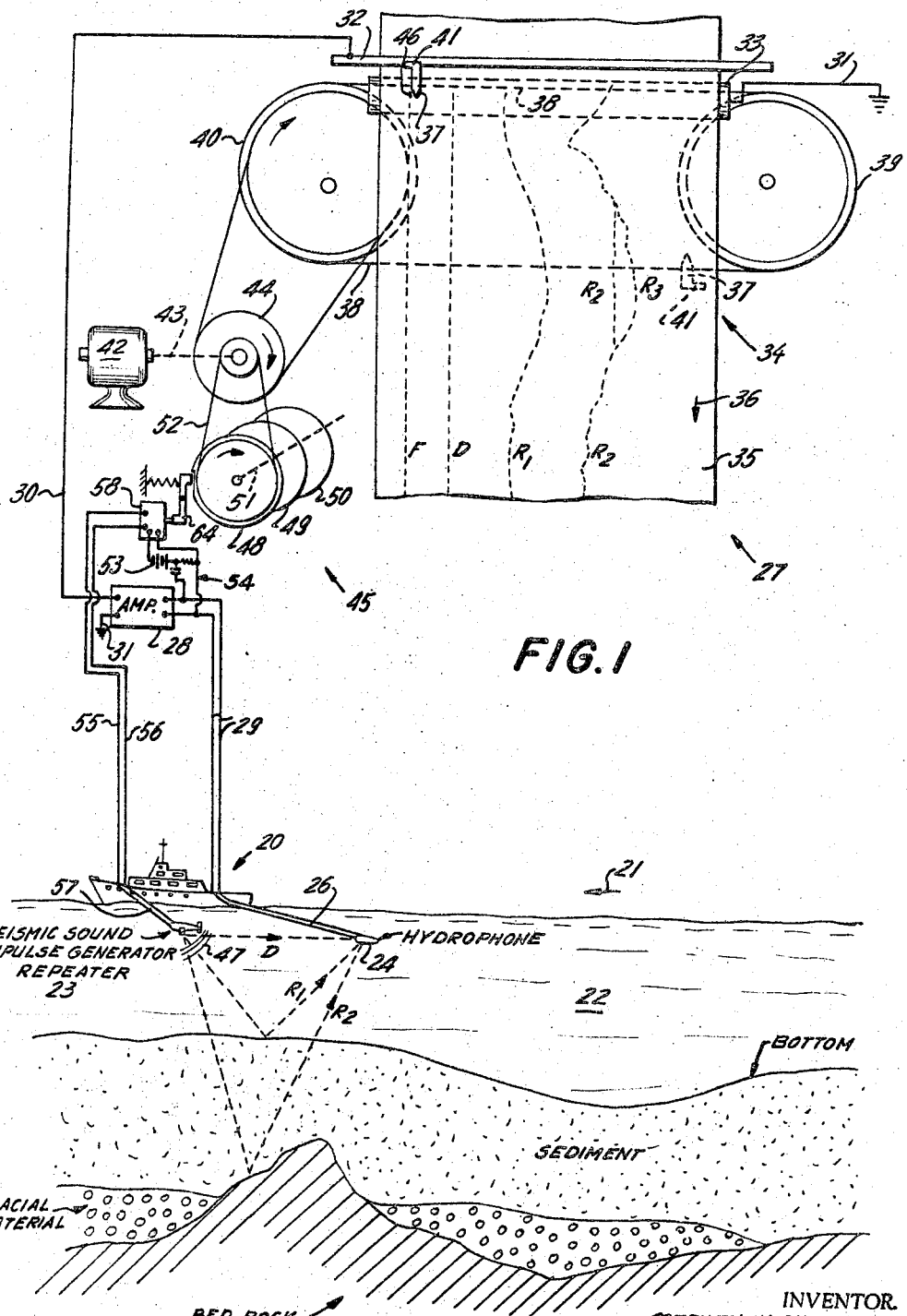
FIGURE 1 is an illustration of a seismic exploration system utilizing powerful sound impulse generated by the sudden release of compressed gas under water in response to electrical control signals and embodying the present invention.
Figure 2:
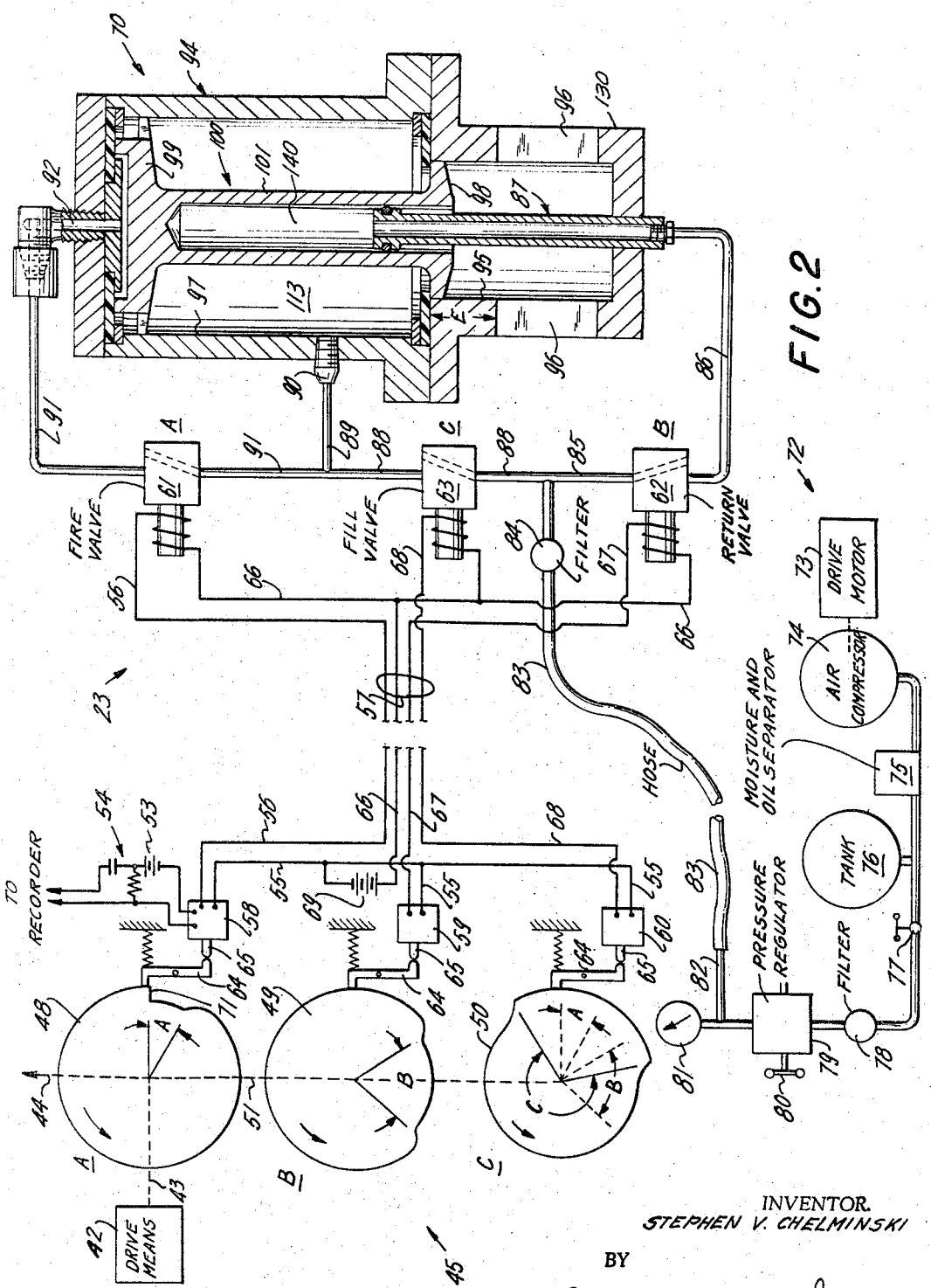
FIGURE 2 shows in detail the acoustical impulse generation system of FIGURE 1 and includes a sectional view of an acoustical repeater and schematic diagram of associated fluid conducting and electrical control circuits as used in the system of FIGURE 1.

When carrying out a seismic survey exploration utilizing the methods and apparatus of the present invention, for example as shown in FIGURES 1 and 2, a survey ship 20 proceeds along a known course 21 on a body of water 22, for example such as an ocean, sea, lake, river, or sound, and the ship 20 tows seismic sound impulse generator repeater apparatus 23 and hydrophone equipment 24. This hydrophone equipment 24 is of known type, for example and may include a single device responsive to acoustical energy in the water 22 or may include a predetermined pattern of such devices, for example such as a line of hydrophones strung out behind the ship at uniformly spaced intervals. The particular arrangement, pattern or array of hydrophone devices depends upon the particular type of seismic survey being performed, as is known in the art and the methods and apparatus of the present invention provide advantages in performing a wide variety of types of such surveys.

The hydrophone equipment 24 is connected through electric cable means 26 extending to the ship, and on board the ship is suitable recording apparatus, which is generally indicated at 27 (FIGURE 1) and is shown in a schematic illustration. This recording apparatus 27 may be of any suitable known type, for example in the illustrative survey system shown in FIGURE 1, the apparatus 27 includes an amplifier 28 having input connections 29 from the hydrophone cable 26. This amplifier 28 is of known type, for example such as is available commercially, and has output connections 30 and 31 extending to an electrical contact bar 32 and to a platen roll 33, respectively, in chart recording apparatus 34. This graphic recording apparatus 34 may be of any suitable known type, for example such as is available commercially from Westrex Co. Division of Litton Industries, New York, N.Y.

During operation a recording paper chart 35 is suitably driven past the platen roll 33, as indicated by the arrow 36, and one or more recording styli 37, which are attached to a driving belt, are sequentially traversed laterally across the front surface of the chart 35 in the region where the rear surface of the chart is engaging the platen 33. The driving belt 38 travels around a pair of pulley wheels 39 and 40 so as to scan each stylus rapidly across the face of the chart. Each stylus includes an electrical brush element 41 which remains in contact with the bar 32 as the stylus scans across the chart. Consequently, the amplified electrical signals from the amplifier 28 are recorded on the chart 35.

For driving the recording stylus mechanism an electric motor 42 has a mechanical drive connection 43 to a drive wheel 44 which is mechanically connected so as to drive the pulley wheel 40.

In order to actuate the acoustical seismic impulse generator repeater apparatus 23 in repetitive cycles, for example, such as every two seconds, main control means 45 (FIGURES 1 and 2) are provided on board the ship 20 and are arranged to operate in predetermined synchronized relationship with respect to the scanning movement of each stylus 37. This control means 45 transmits control signals at cyclic intervals to the impulse generator repeater apparatus for controlling its operation. Also, in this system the control apparatus 45 feeds a signal to the respective stylus 37 which is scanning the chart 35 so as to record a mark 46 on the chart at the instant when a control signal is sent to the apparatus 23 for causing an acoustical impulse 47 to be emitted into the water from the apparatus 23. The line of these initial marks 46 on the chart is identified as the fire line F and serves as a reference from which to determine by measurement on the chart the characteristics of the earth's crust adjacent to the body of water 22. It will be appreciated that other suitable arrangements may be made for providing a reference line or mark on the chart 35 for the purpose of providing a time base or datum line from which the relationships of the other recorded signals may be measured and analyzed, for example, the line D of marks may be used as the datum line.

Each acoustical impulse 47 is propagated through the water 22 so as to travel outwardly away from the sound impulse generator repeater apparatus 23. These impulses are cyclically repeated at frequent, accurate timed intervals, for example, such as once every one or two seconds. A portion of each impulse travels along a direct path D to the hydrophone equipment 24 and produces the line D of marks on the chart 35. At a later interval of time the portion of each acoustical impulse which was reflected from the top of a sediment layer beneath the water 22 reaches the hydrophone equipment 24 along the first reflection path $R_1$ so as to produce a line of marks $R_1$ on the chart. Then subsequently, the portion of each acoustical impulse which was reflected from the interface between the sediment layer and bedrock reaches the hydrophone equipment 23 along a second reflection path $R_2$ so as to produce a line of marks $R_2$ on the chart. Thus, the plots of the received acoustical signals produce an advantageous record of the characteristics of the formations beneath the body of water. When additional interfaces are present, such as a deposit of glacial material, then additional reflection paths are present so as to produce additional plots, such as the line of marks $R_3$ on the chart.

In this illustrative system, more particularly illustrated in FIGURE 2, the main control means 45 includes one or more signal controlling means 48, 49 and 50 which are cyclically operated in synchronized relationship with the chart recording apparatus 34. For example, the signal controlling means 48, 49 and 50 are illustratively shown in FIGURE 2 as being switch controlling cams which are mechanically interconnected as indicated at 51 so that all of these cams 48, 49 and 50 are revolved in synchronized relationship with each other and with the stylus scanning movement. A positive drive connection 52 (FIGURE 1), such as by timing belt, is provided between the drive wheel 44 and the cams 48, 49 and 50.

In order to transmit the cyclic control signals for actuating the acoustical apparatus 23, switch means 58, 59 and 60 (FIGURE 2) are operated in sequence by the respective controlling means 48, 49 and 50. The switch means 58, 59 and 60 are all normally open and they are closed when one end of their actuating levers 64 moves down into recessed regions of the respective cams so as to depress the switch buttons 65. The switch means 58 is connected by a pair of leads 55 and 56 with electric cable means 57 (FIGURES 1 and 2) extending to the acoustical impulse generator repeater apparatus 23. In this system the lead 55 is a common connection, as shown in FIGURE 2, and the wire line 56 extends through the cable 57 to electrically operable firing means 61 for controlling the impulse generator apparatus 23, as will be explained in detail further below. Similarly, the second switch means 59 has one terminal connected to the common line 55 and the other terminal is connected through a wire 67 extending through the cable 57 to electrically operable return means 62 for controlling the impulse generator apparatus 23, as explained further below. The third switch means 60 has one terminal connected to the common lines 55 and its other terminal connected by a wire 68 extending through the cable 57 to electrically operable fill means 63 having a control function explained further below. The common line 55 is connected to one terminal of an electrical power source 69, for example a battery or generator source on the boat 20. The other terminal of this electrical source 69 is connected by a common line 66 extending through the cable 57 to the fire, return, and fill control means 61, 62 and 63, shown as three normally closed solenoid valves which are opened respectively, when they are energized from the source 69.

For providing the reference line F of the marks 46, the switch means 58 includes a second set of normally open contacts connected to a source of potential 53 and through a coupling network 54 to the input of the amplifier 28. Consequently, upon the instant of closure of the switch means 58, there is a brief electrical pulse which is supplied to the amplifier 28 for creating the reference line F. It is noted that the leading edge 71 of the recessed sector A is sharply defined so that the switch means 58 is snapped closed with a quick movement for providing a clearly defined and accurately timed beginning of each firing cycle.

From the above description of the over-all control circuit it will be understood that during operation the fire control means 61 is energized by the source 69 during the time period when the recessed sector A of the cam 48 passes beneath the end of the actuating lever 64 for the switch means 58. Subsequently, the return control means 62 is energized by the source 69 when the recessed sector B of the cam 49 passes beneath the end of the actuating lever 64 for the switch means 59. As indicated in FIGURE 2, there is an angular spacing between the sectors A and B so that the return control means 62 is not operated until after the apparatus 23 has completed its firing operation and has emitted the powerful acoustical impulse 47. The completion of the cycle is made by energization of the fill control means 63, which occurs when the recessed sector C of the cam 50 passes beneath the end of the actuating lever 64 of the switch means 60. The initial portion of the fill period C overlaps the latter portion of the return period B so as to assure that the apparatus 23 is held in its returned condition when the filling occurs. It is noted that the length of time of the fill period C is many times longer than the fire period. As will be explained in detail further below the actual firing time of the apparatus 23, which includes an acoustical repeater 70, is very brief, being of the order of a few milliseconds for the sudden complete release of the high pressure gas from the apparatus 23.

In order to supply gas under high pressure to the impulse generator repeater apparatus 23, the system includes a suitable source 72 of high pressure gas located on the ship 20. In this system the gas being used is compressed air, and the source 72 includes a prime mover drive motor 73 running a multistage air compressor 74, which is capable of supplying compressed air at pressures up to and in excess of 2,000 pounds per square inch. The output of the compressor 74 feeds through a moisture and oil separator 75 into a high-pressure storage tank 76. The compressed air is supplied from the tank through a shut-off valve 77 and through a first filter 78 into a pressure regulator 79 having a manual adjusting control 80 which is set at a desired pressure level, for example such as 2,000 p.s.i. At the output of the regulator is a pressure gauge 81 and a pipe coupling 82 connected to a flexible high-pressure fluid supply hose 83 extending to the impulse generator repeater apparatus 23. Included in the apparatus 23 is a second filter 84 having a porous bronze filter element or similar filter barrier element for preventing the entry of dirt particles or fibers into the apparatus 23.

Beyond the filter 84 the hose line branches and one branch 85 is connected through the normally-closed return control valve 62 and through a hose line 86 to return means 87 in the acoustical repeater 70, as shown also in greater detail in FIGURE 5. The other branch 88 of the high-pressure fluid supply line 83 is connected through the normally-closed fill control valve 63 and through a hose line 89 into a fill port 90 entering the repeater 70. Also, a firing hose line 91 branches from the line 89, and this firing line 91 provides a fluid-conducting passage extending to a firing port 92. This firing passage 91 is normally shut off by the firing control valve 61.

Although a pair of control valves 61 and 63 are illustrated in FIGURE 2 for providing the filling and firing functions, it will be understood that they can be replaced by a single three-way connection solenoid valve located at the junction of the lines 88, 89 and 91 for providing these two functions, for example as shown in the system in FIGURE 11.

Referring particularly to FIGURES 2 and 5, the acoustical repeater 70 as illustratively shown comprises container means adapted to hold fluid therein under high pressure and to discharge the fluid suddenly in a very brief time period in response to an external control signal. Because of the fact that the repeater 70 is cyclically subjected to high stresses in operation and is exposed to corrosive environmental conditions, for example, it may be submerged in salt water for long periods of time, it is constructed of high-strength corrosion resistant material, such as high strength stainless steel. The container means 94 includes a plurality of axially aligned cylinders each having a piston in sliding engagement therewith. These pistons are rigidly interconnected so that they are capable of movement with very great acceleration over a predetermined distance before suddenly discharging the high-pressure fluid through vent means from the repeater 70. One of these pistons serves as opening and closing means for containing and then releasing the high pressure fluid, and another piston serves as operating means for the first piston for holding it closed and then for releasing it in response to the external firing signal so that the pistons then move with very great acceleration before the first piston opens the vent means for discharging the high-pressure fluid.

Consequently, the vent means are opened abruptly, for the first piston is travelling very fast at the instant when the vent means are opened, thus advantageously providing an effectively instantaneous transition from fully closed to fully open condition.

As shown illustratively in FIGURES 2 and 5, the container means 94 includes a first cylinder 95 which extends toward vent means 96 and a second cylinder 97 which is axially aligned with the first cylinder 95. A first piston 98 travels along the cylinder 95 and serves as closing means for blocking the discharge port so as to contain the high-pressure fluid within the container means 94.

For operating the first piston 98 there is a second piston 99 which travels along the cylinder 97, and these two pistons are rigidly interconnected to form a shuttle 100 which is constructed so as to be as light as possible while being sufficiently strong to withstand a very great acceleration and subsequent very great deceleration in the axial direction. A hollow piston rod 101 rigidly interconnects these two pistons 98 and 99.

When the shuttle 100 is in its normal position prior to firing, the first piston 98 is located at the upper end of the cylinder 95 remote from the vent means 96. The rim of the piston 98 is in sealing engagement with a first annular resilient seal 102 which is clamped in place by a metal clamping retainer ring 103 held by an internal shoulder 104 at the lower end of the cylinder 97. The seal 102 is formed of a very tough, resilient material, for example, tough, solid polyurethane, and it has sufficient ability to be bent and yet to return to its original shape so as to enable it to be slid over the perimeter of the piston 98 when the shuttle 100 and seal 102 are being assembled and sufficient durability to withstand the operating conditions. From experiments I have found that it is desirable to machine the two pistons 98 and 99 and the hollow connecting rod 101 as an integral member so as to provide sufficient strength and durability to withstand the very great acceleration and deceleration forces and pressures encountered during operation repeatedly over thousands of operating cycles.

The cylinder 95 includes a strong flange 106 mating with a strong flange 107 on the lower end of the cylinder 97. The upper end of the cylinder 95 projects somewhat above the top surface 108 of the flange 106 so as to form a lip 109 engaging with the lower end of the upper cylinder below the internal shoulder 104 for precisely aligning the two cylinders. The flange surface 108 has an annular groove containing an O-ring 110 abutting against the flange 107 preventing leakage of high pressure fluid from the housing 94. A bolt circle 112 holds the flanges 106 and 107 tightly together.

In preparation for firing, gas under pressure, for example 2,000 p.s.i. is introduced through the fill port 90 into the chamber 113 within the cylinder 97. The pressure of the gas upon the upper surface K (FIGURE 5) of the piston 98 is tending to drive this piston down along the cylinder 95.

In order to hold this piston in place, the second piston 99 has a surface L (FIGURE 5) exposed to the pressure fluid in the container and of larger effective area than area K and facing in the opposite direction from area K. This second piston has an annular lip sealing element 114 engaging up against a second annular tough resilient seal 115. This seal 115 may be formed of the same material as the seal 102. A clamping retainer ring 116 is held against the outer edge of the seal 115 by an internal shoulder 117 at the upper end of the cylinder 97. The inner edge of the seal 115 is held by a retainer disc stop 118 having a rabbeted edge overlapping the seal 115. A plurality of bolts 119 secure the disc 118 against the cylinder head wall 120. This end wall 120 is fastened by a bolt circle 121 to a flange 122 on the cylinder 97. The wall 120 includes an annular groove containing an O-ring 123 for preventing leakage of the high pressure fluid from the housing 94.

As will be explained, when the repeater 70 is fired, the pressure within the chamber 113 drops very abruptly. Consequently, it is desirable to prevent the accumulation of any high pressure fluid behind the seal 115, because any such pocket of gas would tend to blow the seal 115 away from the end wall 120 upon firing. Accordingly, a small diameter bleed hole 124 passes through the end wall 120 and communicates with a bleed channel 125 behind the seal 115. The outer diameter of the sealing lip element 114 is greater than the diameter of the piston 98. The upper surface M of the piston 99 engages against the retainer and stop disc 118 as the lip 114 begins to press into the resilient seal 115. This stop 118 prevents the large thrust of the piston from embedding the lip element 114 deeply into the seal 115.

The shuttle 100 is in effect in unstable equilibrium, being temporarily held in place by the differential in areas, but as soon as the pressure nears equalization on opposite surfaces of the operating piston 98, then the shuttle is released and accelerates violently.

In order to fire the repeater 70, communication is provided between the chamber 113 and the upper surface M of the piston 99 so as to tend to equalize the pressures against opposite sides L and M of the operating piston 99. A passage is completed from the fill port 90 through the line 91 to the firing port 92 by opening the firing valve 61. There is a small chamber 126 surrounding the firing port 92 adjacent to the surface M of the piston 99, and the high pressure fluid enters through the port 92 into this chamber 126 thus tending to equalize the pressure against opposite surfaces M and L. The high pressure fluid pressing against the surface K of piston 98 soon overbalances the holding force of the piston 99, so that the piston 98 begins to accelerate rapidly down the cylinder 95. Thus, the sealing element 114 is moved away from the seal 115.

Immediately, the fluid in the chamber 113 is free to rush up through the multiple by-pass openings 127 (FIGURE 8) in the scalloped periphery of the piston 99 so as to equalize completely the pressure against opposite sides M and L of the piston 99. As shown in FIGURE 8, the lands 128 between the by-pass openings 127 serve as guide means travelling along the cylinder surface 97. It will be understood that these by-pass openings 127' may also be provided by lands 128' (FIGURE 5A) extending along the cylinder wall.

For imparting a slight rotation to the pistons 98 and 99, the by-pass openings 127 are skewed as shown in FIGURE 8 and the gas rushes through these openings to provide a torque reaction. Thus, advantageously the pistons 98 and 99 are turned in position between each firing stroke so as to avoid continued wear of the lands 128 always along the same axially extending lines on the cylinder surface 97.

The two pistons 98 and 99 accelerate downwardly with very great acceleration along the acceleration distance E, but the high pressure gas is prevented from escaping through the vent means 96 until after the rim of the piston 98 has passed below the upper end of the vent means 96. The vent means 96 (please see also FIGURE 6) comprise a plurality of openings to the exterior of the housing means 94 and communicating with the lower end of the cylinder 95. The vent means 96 are in the lower end portion 130 of the housing means 94, and the longitudinally extending areas 131 (FIGURE 6) between each of the vent openings serve as guide surfaces for guiding the piston 98.

As the piston 98 travels along the acceleration distance E, it accelerates extremely rapidly to a high velocity so that the piston 98 passes the end 132 of the cylinder 95 extremely fast and traverses past the vents 96 almost instantaneously so that they become fully open in a minute fraction of a second. To explain this advantageous high rate of speed of opening, the following discussion is believed to be helpful.

In this illustrative example the chamber 113 has a volume of one hundred thirty-five cubic inches and is charged with compressed air to a pressure of 2,000 p.s.i. The diameter of the opening piston 98 is 3.1 inches, and the acceleration distance E is one inch. The shuttle accelerates to a velocity in excess of 40 feet per second before the opening piston 98 begins to open the discharge openings 96. Thus, the compressed air is all released within a few milliseconds after the piston passes the end 132 of the cylinder 95. The high pressure gas is thus released with effectively an extremely abrupt discharge which approaches explosive abruptness.

However, in addition to the many other advantages, this abrupt release of gas under water creates a seismic "boom" providing energy in the low frequency end of the acoustic spectrum, for example the repeater 70 can be arranged to provide substantial sound energy below 100 cycles per second. This intense low frequency acoustical impulse has great penetrating ability into the various layers and formations of earth so as to provide a good legible chart record, including indications of very deep formations. For example, in a deep body of water having 3,000 feet of depth a record may be obtained of formations down to 3,500 feet below the bottom of the water, i.e., a total depth of 6,500 feet below the ship and often deeper. Advantageously, the acoustical impulse can be repeated hundreds or thousands of times at frequent accurately timed intervals, of the order of a few seconds, e.g., once every two seconds. Also, the repeater 70 can be arranged to provide substantial sound energy at higher frequencies, for example above 1,000 c.p.s. which is desirable for certain types of surveys such as ones in shallow water.

In distinction to this system it is noted that when explosives are used, such desirable repetition at frequent intervals and such control over the sound energy spectrum is not obtained and in many instances the sound energy released by the explosion does not have such desirable characteristics as the acoustical impulse generated by the methods and of the present invention.

In order to decelerate the pistons 98 and 99 quickly but smoothly near the end of the stroke, the housing means 94 includes a stop surface 134 which is in opposed relationship to the surface N of the piston 98. As the piston 98 nears the end of its stroke the water between the approaching surface N and 134 is accelerated generally radially outwardly, providing a retarding force reaction against the surface N. Moreover, the converging lower ends 135 of the vents 96 cooperate with the rim of the piston 98 to form throttling means, i.e., flow control means, progressively restricting the egress of the water so as to increase the deceleration rate until the piston is brought to rest adjacent to the surface 134.

The repeater 70' shown in FIGURE 5A is similar to the repeater 70 of FIGURE 5 except that the piston 99' has a circular perimeter, and the by-pass passages 127' comprise grooves extending along the cylinder wall 97 with lands 128' between these grooves. The pressure fluid rushes through these by-pass passages 127' as indicated by the flow arrow in FIGURE 5A as the shuttle accelerates very rapidly downwardly as shown by the arrow, and the lands 128' serve as guides for the piston.

As shown in FIGURES 7, 7A and 7B, various configurations of vents 96 may be used to provide different effective rates of discharge and of piston deceleration. As explained above the configuration of FIGURE 7 provides a very abrupt discharge of the high pressure fluid and a smooth deceleration.

The rectangular vent configuration of FIGURE 7A produces a very abrupt discharge and an abrupt deceleration of the piston at the end of its stroke. This rectangular configuration generally provides the maximum effective vent area for a given stroke, which is of advantage for compact repeater devices wherein the stroke is desired to be relatively short.

In the vent configuration of FIGURE 7B, the initial diverging end 132 provides a modified discharge rate of the high pressure fluid so as to reduce the initial portion of the discharge flow below that occurring when using the configuration shown in FIGURES 7 and 7A.

After the conclusion of the firing, the pistons 98 and 99 are returned to their initial positions by supplying fluid to the return means 87. The return means 87 comprise a pedestal 137 having a bore 138 and including suitable sealing means 139 adjacent to its end, for example sealing means such as piston rings, O-rings, and the like, fitting in grooves on the pedestal. The fluid is supplied through the line 86 and through the bore 138 into a cocking chamber 140 within the hollow piston rod 101. In effect this fluid cooperating with the return means 87 acts as resilient means for returning the pistons 98 and 99 to their initial position. For rigidity the pedestal 137 includes a large base flange 141 (FIGURE 5) engaging the end 130 of the housing means.

When it is desired to obtain the greatest possible acceleration of the two pistons, then the return fluid is allowed to escape from the cocking chamber 140 after the return solenoid valve 62 is closed, so that there is a minimum amount of fluid in the chamber 140 which would somewhat impede the downward acceleration of the pistons. This return fluid bleeds out through a small passage 142 (FIGURE 5) and through a check valve in a fitting 143 communicating with the cocking chamber so that the pressure in chamber 140 returns substantially to ambient. This check valve prevents the entry of water into the cocking chamber 140.

A bleed hole 144 (FIGURE 5) communicating with the firing port 92 prevents any accidental rise in pressure in the firing chamber 126 and thus avoids any possibility for accidental self-firing of the repeater 70, in the event it remains fully charged for long periods of time. Thus, any minute amount of high pressure fluid leaking past the sealing means 114, 115 over a long period of time is prevented from accumulating in the firing chamber 126.

Figure 3:
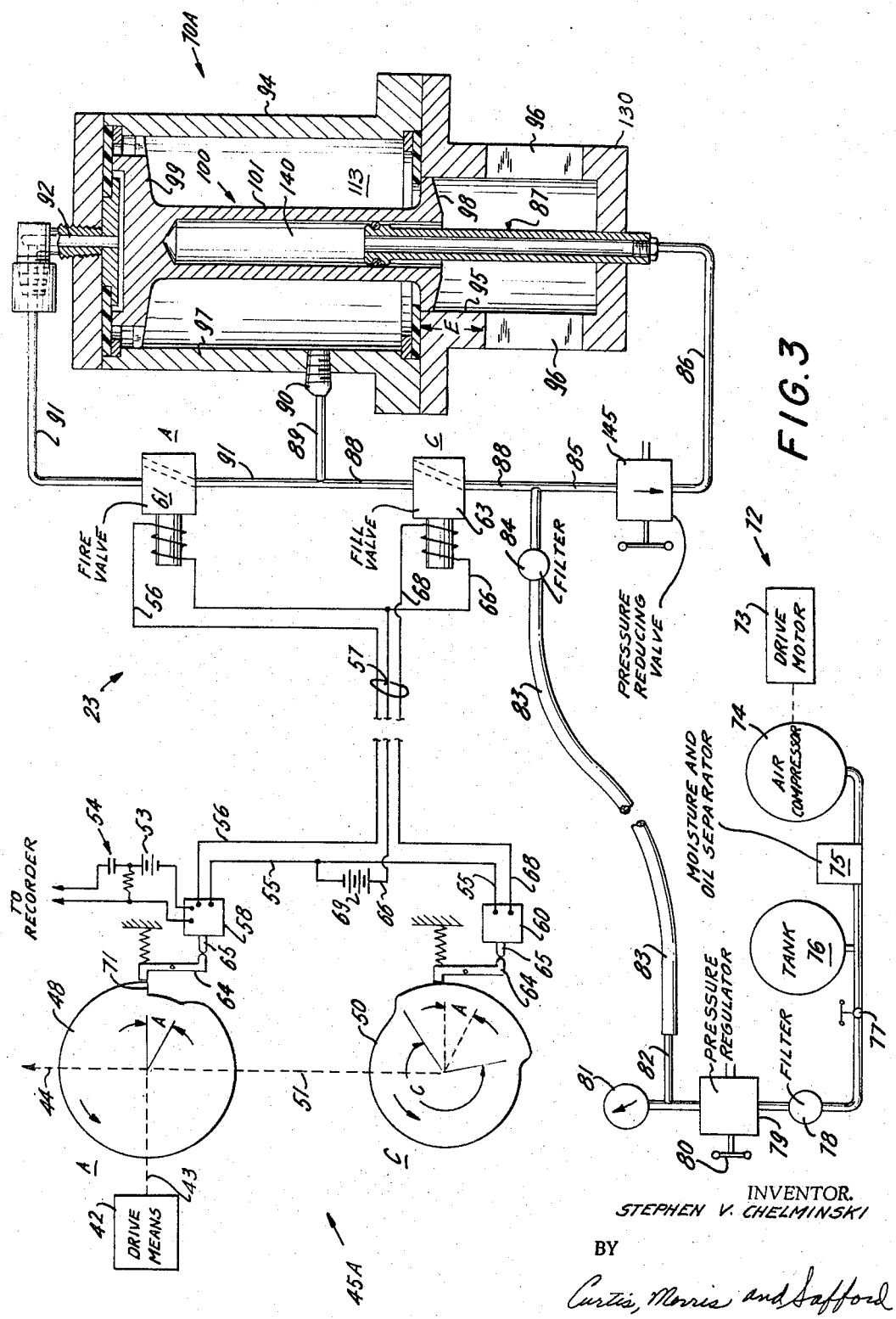

In the remaining figures of the drawings parts and elements performing functions corresponding to those of FIGURES 1, 2, and 5–7 have corresponding reference numbers. The system of FIGURE 3 is identical to that described above, except that the control means 45A includes only firing and filling control means and correspondingly the impulse generator repeater apparatus 23 includes only two solenoid valves 61 and 63 and associated circuit connections. The return means 87 is continuously supplied during operation with return fluid provided by a pressure-regulating valve 145 in the line 86. This valve 145 is set at a pressure somewhat above the ambient pressure at the depth of operation. By virtue of the fact that this valve is on continuously and the pressure in the cocking chamber 140 is considerably below the high pressure of the main charge, the bleed passage 142 (FIGURE 5) and check valve 143 may be omitted from the repeater 70A used in the system of FIGURE 3. Although a pair of control valves 61 and 63 are illustrated in FIGURE 3, it will be understood that they can be replaced by a single three-way connection solenoid valve located at the junction of the lines 88, 89 and 91 for providing the filling and firing functions as shown in the system of FIGURE 11.

In summary it is noted that the chamber 113 in the repeaters 70, 70′ and 70A within the cylindrical surface 97 serves as a combined operating and charge-containing chamber, as shown in FIGURES 2, 3, 5 and 5A.

The system illustrated in FIGURE 4 is generally similar to the systems of FIGURES 1–3 and 5–7, except that the repeater 70B, as shown in greater detail in FIGURES 15 and 16, includes a combined cocking and operating chamber 148 defined by the cylinder 97 in addition to a charge-containing chamber 113 within a cylinder 150 of the housing 94 and a cylinder 95 along which the piston 98 is accelerated through a distance E (FIGURE 15). This repeater 70B includes a middle portion 151 having vent means 96 (FIGURE 16) at the lower end of the cylinder 95. The middle portion 151 has an annular guide 152 slidingly engaging the hollow piston rod 101, and a piston ring 149 surrounds this rod.

In operation during the return-and-fill part of the cycle the high-pressure fluid is introduced into the chamber 148 and serves to return the shuttle 100B so as to seat the sealing element 114 up against the resilient static seal 115. The fluid passes up through a passage 153 in the piston rod 101 and into the charge-containing chamber 113 to fill it also. A construction 154 (FIGURE 15) in the passage 153 maintains the pressure in the chamber 148 above that in the chamber 113 during the beginning of the return and fill sequence so that there is provided a net upward thrust on the projected area of the piston rod 101 exposed to the pressure of the fluid in the chamber 148, said pressure being retained by the piston ring 149. This net upward thrust assures that the sealing lip element 114 remains seated firmly during the initial portion of the fill cycle as the fluid begins to be introduced. The effective area L of the operating piston 99 exceeds the effective area K of the closing and opening piston 98 and holds this piston in its closed position as the filling continues.

After the chamber 113 is filled up to the desired pressure, then the apparatus 23B (FIGURE 4) is fired at the appropriate instant by opening the firing solenoid valve 61 so as to provide communication between the high-pressure fluid and the top surface M (FIGURE 15) of the piston 99. This flow tends to equalize the pressure against opposite surfaces L and M of the operating piston 99. As soon as the sealing element 114 has left the seat 115, then the fluid rushes up through the openings 127 in the scalloped perimeter of the piston 99. These openings 127 are inclined to provide a torque reaction for rotating the shuttle 100B.

The pistons 98 and 99 pick up speed with very great acceleration as the piston 98 travels through the acceleration distance E, and thus the piston 98 is moving at a high rate of speed as it passes the end 132 of the cylinder 95 so as to open the vents 96 very abruptly.

There is a conical stop surface 134 (FIGURE 15) opposed to the conical surface N of the piston 98 for decelerating the two pistons at the conclusion of their high-speed stroke by forcing the water out from between these two surfaces as the shuttle 100B nears the end of its stroke.

The static seal 115 is of tough resilient material similar to the seals in repeaters 70, 70′ and 70A, and the seal 102 may be made of this material; however, if desired, the seal 102 which defines the discharge port from the charge chamber 113 may be made from a very tough and durable flame-resistant material such as strong metal, e.g., stainless steel, beryllium, bronze and the like. In the repeaters into which fuel is injected and burned, it is advantageous to form this seal 102 of a very tough and hard strong material such as metal to withstand the discharge of heated combustion products therethrough. A resilient sealing element 155, for example such as an O-ring provides a seal with the casing, and the seal 153 permits the metal seal 102 to rise slightly away from a shoulder 147 when it is in sealing engagement with the piston 98 so that the lip 114 of the other piston presses firmly against the static seal 115. Spring means 159, for example such as a wave spring urges the movable seal element 102 down toward the shoulder 147.

In this illustrative example the chamber 113 has a volume of ten cubic inches, the diameter of the piston is 1.75 inches, and the acceleration distance E is ⅜ of an inch. The shuttle 100B attains a velocity in excess of 40 feet per second before releasing the pressure fluid, and the high-pressure gas is discharged from this repeater 70B in the order of a few milliseconds after the piston 98 has left the end 132 of the cylinder 95.

The lower end of the cylinder 97 is closed by an end wall 156 which contains the fill passage 90. A flange 157 on the container 94 is extended and contains an additional row of bolt holes 158 for mounting purposes, if desired.

The repeater 70B′ shown in FIGURE 15A is similar to the repeater 70B of FIGURE 15, except that the perimeter of the piston 99′ is circular, and the by-pass passages 127′ are provided by grooves in the cylinder wall 97. The pressure fluid rushes up through these grooves 127′ as shown by the flow arrow thus tending to equalize the pressure acting upon opposite sides of the operating piston 99′, and the shuttle 100B′ accelerates very rapidly toward the open position, while the lands 128′ between the grooves 127′ serve to guide the piston.

As shown in FIGURES 9 and 10 the acoustical impulse generator repeater apparatus may conveniently be mounted on a submersible housing and chassis unit 160 having a hollow tail boom 161 and tail fins 162 for stabilizing the unit as it is towed through the water. A towing arm 163 is pivotally attached at 164 to a top adjustable mounting bracket 165 having a plurality of pivot holes 166 therein. A towing cable 167 extending from the ship 20 is attached to the upper end of the arm 163. A pair of protective guards 168 straddle the arm 163 to protect the hose 83 and the electric control cable 57 from accidentally being pinched or sheared between the arm 163 and the housing 170 in the event the unit 160 is placed upside down on the deck of the ship.

Any of the acoustical repeaters and any of the exploration systems discussed above and those discussed hereinafter may use such a unit 160 if desired.

A seen most clearly in FIGURE 10, a removable section 171 of the housing surrounds the repeater apparatus and is secured by bolts 172 to a heavy mounting plate 173. The space 174 within the housing 170 above the mounting plate 173 is a water-tight chamber as explained in detail further below, but water is free to enter the remaining spaces within the unit 160 for pressure equalization. The water may enter a lower space 175 through a large opening 176 surrounding the repeater apparatus and flow into a forward space 177 in front of a partition 178 and enter a rear space 179 communicating with the interior of the tail boom 161 which is also open at its tail end. The front partition 178 and a rear partition 180 close off the water-tight compartment 174, which remains filled with a suitable insulating fluid, for example such as air, oil, or the like, during operation so as to protect the various components and control elements of the systems housed therein as shown.

The electric cable 57 enters the housing through a rubber grommet 181 (FIGURE 9) and then passes through a water-tight seal 182 in the partition 180 and extends to a terminal panel block 184 within the compartment 174 to which one or more of the various solenoid valves 61, 62 and 63 are connected by suitable leads as shown, depending upon which of the control systems is used as shown in FIGURES 2, 3, 4, 11, 14 or 17. The hose 83 enters through another grommet 185 and is connected through a fitting 186 and through a removable base plate 187 to the lines to the respective controllable valve means, as shown in the systems of FIGURES 2, 3, 4, 11, 14 or 17. The base plate 187 is removably fastened by studs 188, and an O-ring gasket 189 provides a seal.

A pressure relief valve 190 (FIGURE 9) prevents the pressure in the compartment 174 from rising excessively in the event of bleeding or slight leakage of high pressure gas into this compartment. For strength and rigidity, the firing passage 92 extends directly from the firing valve through the base plate 187 and suitable O-ring gaskets 191 provide sealing means.

In FIGS. 11 and 12 the principles of the invention are shown as applied to a pneumatic acoustical device comprising a cylinder 220 having end walls 221 and 222. Ports 223 and 224 are provided within the end walls 221 and 222 and they are in axial aligned relation. The port 223 is of somewhat smaller diameter than that of port 224 for a purpose to be described later. A piston rod 225 may extend through the cylinder 220, and it may support pistons 226 and 227 spaced therealong so that in one axial position of rod 225, pistons 226 and 227 close ports 223 and 224, and in another position open said ports. The piston 226 may be threaded onto the end of the rod 225, while the piston 227 may be rigidly held against a collar 228 on rod 225 by a nut means 229 threaded onto rod 225.

The end wall 222 may include an internally threaded flange 230 for receiving a hollow cap member 231 that forms a chamber 232 having its one side closed by piston 227 when the latter is in its uppermost position. The wall of the cap 231 may overlie the piston 227 thereby to limit its movement in one direction.

The piston rods 225 may extend upwardly above the end cap 231 and may have an adjustable stop 233 held thereto by a jam nut 234. A spring 235 within cylinder 220 may act against one surface of piston 227 and a disk 236, which latter may adjustably be fixed at a predetermined location within the cylinder 220 by means (not shown) fixing it to the side wall thereof. The disk 236 may be provided with large passages 237 therethrough so as not to interfere with the free flow of fluid from one to the other side thereof. The piston rod 225, of course, makes a sliding fit with a bored boss 238 of the disk 236. From the foregoing it is evident that spring 235 normally assists in the return of the piston rods 225 and pistons 226 and 227 to the position shown in FIG. 11.

The cylinders 220 may be connected by a line 239 to a solenoid operated valve 240. The chamber 232 may also be connected through a line 241 to the valve 240, and the valve 240 may be connected to a high-pressure compressor 242 through a flexible line 243.

With the apparatus in the condition shown in FIG. 11, with chamber 232 vented through the valve 240 and line 243 connected to line 239 through valve 240, fluid under a great pressure may be supplied to the cylinder 220. Since piston 227 is of greater area than that of piston 226, the apparatus remains in the condition shown in FIG. 11.

Upon operating the solenoid valve to connect chamber 232 with cylinder 220, the pressure on each side of piston 227 is equalized, causing the piston 226 and rod 225 to move downwardly very rapidly, permitting the very rapid escape of the pressure fluid in cylinder 220 through port 223, which action produces an acoustical wave of great intensity. Operating valve 240 to vent chamber 232 causes spring 235 to return the rod 225 and pistons 226, 227 to the position shown in FIG. 11, and reconnecting line 243 to line 239 through valve 240 recharges cylinder 220 preparatory to producing another acoustical wave.

Referring to FIG. 13, the principles of the invention are shown as applied to an apparatus similar to that shown in FIG. 11. The cylinder 220 is supported on legs 262, and a cylinder 263 extends downwardly from port 223, within which the piston 226 reciprocates. The piston rod 225 extends downwardly through the cylinder 263 and supports at its lower end a hammer 264. The lower end of the cylinder 263 may be provided with a counterbore 265 which vents the high pressure fluid from cylinder 263 when piston 226 reaches the bore 265. From the foregoing it is evident that upon tripping the solenoid valve 240 (FIG. 11), the full pressure of the fluid within cylinder 220 acts on the piston 226, imparting a very great acceleration to the hammer 264.

The embodiment shown in FIG. 14 is similar to the apparatus shown in FIG. 11, except it includes a device 266 for injecting fuel under high pressure into the cylinder 220 when the latter is under pressure from source line 243. An electrical heating element 267 may be mounted in cylinder 220 for the purpose of igniting the fuel as it is injected into cylinder 220. The embodiment shown in FIG. 14 is triggered by the injection of the fuel into cylinder 220, and a slight interval later, the solenoid 240 may be actuated, causing the downward thrust of pistons 226 and 227 when the highly pressurized fluid exhausts from port 223, producing the acoustical wave of great intensity. It is to be understood that the fuel injection means 266 of the embodiment shown in FIG. 14 may, if desired, be incorporated with any of the other embodiments of the invention with equal facility.

The embodiment of FIGURE 17 is similar to the apparatus shown in FIGURES 4, 15 and 16, except that it includes a device 266, for example such as an oil burner spray nozzle, a fuel injector of the type for a diesel engine, and the like for injecting fuel under high pressure into the charge-receiving chamber 113 after it has been filled with air under high pressure. An electrical heating element 267, for example a resistance wire element, serves to ignite the fuel, thus greatly raising the pressure in the chamber 113. After the fuel has burned, the firing control means 61 is actuated by an electrical signal for abruptly releasing the products of combustion so as to produce an intense acoustical impulse. The fuel injection device 266 is mounted at an angle with respect to a radial line of the cylinder 113 so as to produce a swirling motion of the charge within the chamber 113. It will be understood that fuel injection devices as shown in FIGURES 14, 17 and 17A may be incorporated with any of the embodiments of the invention disclosed herein.

The embodiment 70J shown in FIGURE 17A is similar to the apparatus shown in FIGURES 4, 15, 16 and 17, except that the device 266 for injecting fuel and the igniting means 267 are arranged so as to burn the fuel in the chamber 148. The increase in gas pressure in the chamber 148 causes gas to flow up through the passage 153, thus also raising the pressure in the chamber 113. The apparatus is fired by admitting gas through the firing passage 92.

In FIGURE 20 is shown an embodiment of the invention similar to that of FIGURE 18, except that the shuttle 100 includes a small orifice 270 for providing communication through the wall of the hollow piston rod 101 between the return chamber 140 and the charge-containing chamber 113. This orifice 270 may be provided in any of the embodiments of FIGURES 2, 3, 5, 5A, and 18. By providing this passage 270, the chamber 113 is filled by fluid supplied through the return line 86 (FIGURES 2, 3, 5 and 18); so that the return means serves to fill the repeater after the shuttle 100 has been returned to its initial position. Thus, the fill valve 63, fill line 89, and fill port 90 can be omitted, enabling the use of a control system of the type shown in FIGURE 4, wherein a firing valve 61 provides the control action.

The amplitude (source level) of the repeater acoustical pulse may be varied in each of the embodiments disclosed herein by adjusting the pressure in or the volume of the charge-containing chamber. The pressure and volume may be adjusted independently of each other. The frequency of the acoustical pulse may also be controlled by adjusting the pressure in or the volume of the charge-containing chamber.

It is to be noted that it is in advantage of the illustrative embodiments of the present invention disclosed herein that they enable these two characteristics of the pulse (source level and frequency content) to be varied independently of each other. For example, if it is desired to vary the frequency of the pulse while maintaining the source level constant, the pressure in the charge-containing chamber may be varied in one direction, e.g., increased, while the volume is varied in the other direction, e.g., decreased.

Increasing the volume of the charge-containing chamber lowers the frequency and increases the intensity for a given pressure providing that the apparatus releases the high-pressure fluid within the same brief instant.

The embodiments of FIGURES 18 and 19 are provided with means 279 for adjusting the effective volume of the charge-containing chamber. The position of a piston 280 is moved along a volume adjusting cylinder 281 during operation by adjusting the position of a control piston 282 in a control cylinder 283 on the ship. Suitable liquid such as hydraulic fluid 284 fills the region 285 behind the controlled piston 280 and the region 286 in front of the piston 282. A crank 287 and feed-screw 288 adjust the position of the piston 280 by displacing the hydraulic liquid 284 by moving the piston 282 against the action of a spring in the chamber 286.

It is to be understood that the volume-adjusting means 279 of the embodiments of FIGURES 18 and 19, may if desired be incorporated with any of the other embodiments of the invention including those which utilize fuel injection.

In the foregoing illustrative examples of the present invention the control signal for initiating the firing of the repeater has been an electrical signal for actuating a solenoid valve. As further illustrative embodiments of the methods and apparatus of the invention it is noted that these valves can be replaced by fluid-actuated valves such as pneumatically operated valves, valves operated by hydraulic fluid, and the like. In these fluid-actuated control systems the control signal is transmitted through a fluid containing line such as a hydraulic line, pneumatic line, and the like for firing the repeater.

Also, with reference to the embodiment of FIGURE 17 wherein the shuttle is returned and held by a combined return and operating chamber 148 (see FIGURE 15), and the fuel is injected into the charge-containing chamber 113, it is noted that a sudden rise in pressure in the charge chamber 113 relative to chamber 148 can be used to fire the repeater. The restriction 154 causes a delay in the rise in pressure in the operating chamber 148 when the pressure is suddenly raised in the chamber 113. Thus, a substantial pressure differential may be created for a brief period when intense combustion occurs in the charge chamber 113. Consequently, the shuttle-holding force being exerted by the operating piston 99 is over-balanced by the higher pressure arising in the charge chamber 113, resulting from the sudden injection and burning of substantial quantities of fuel. It is noted that the embodiment of FIGURE 17 can be fired by the sudden injection and burning of fuel in response to a suitable signal. This signal may be transmitted by various transmission means such as an electrical signal, a hydraulic signal, pneumatic signal, and the like. Alternatively, the fuel may be injected and then ignited sometime after injection by an ignition signal.

Instead of suddenly raising the pressure in the chamber 113, a differential between the pressures in the two chambers 113 and 148 can also be created by suddenly dropping the pressure in the chamber 148, for example by discharging fluid abruptly from the line 86 by opening a pressure-release valve in this line.

In systems where it is desired to produce a sudden and substantial amount of combustion in the repeater of FIGURE 17, and yet it is desired to initiate firing by admitting fluid through the firing line 92 (FIGURE 15) in response to a firing signal, then the area L of the operating piston 99 is increased relative to the area K of the opening and closing piston 98. The ratio of areas is determined by the maximum differential in pressure which is desired to be retained, that is, the product of the effective area L times the pressure in chamber 148 must at all times exceed the product of the effective area K times the pressure in chamber 113. Then the shuttle is retained in place, and its violent acceleration is initiated by admitting fluid through the firing passage 92 in response to a firing signal.

The piston ring 149 also provides the function of preventing accidental firing, the same as is done by the bleed hole 144 (FIGURE 5). Any slight leakage tending to raise the pressure against the piston surface M is offset by leaking past the piston ring 149 and thence out to the exterior of the apparatus through the vent means 96. The lower surface of the annular guide member 152 may include a plurality of shallow radial grooves communicating with the region surrounding the piston rod 101 for assuring the escape of any undesired fluid from behind the piston 98 until the desired instant of firing has arrived.

The embodiments of FIGURES 4, 15, 15A, 17, 18, 19 and 20 are adapted to be arranged for self-actuating-firing operation, i.e. automatic operation, which is an advantage in enabling the control of the repeater to be accomplished by means of the characteristics of the pressure in the supply line 83, as may be desired in certain systems. In order to provide for self-actuating, firing operation, automatic operation, the effective area of the surface K is made larger than the effective area of the surface L. This is accomplished in either of two ways: (1) by actually making the effective area K of piston 98 larger than the effective area L of pison 99, or (2) the effective area of the sealing element 102 is added to the area of the piston 98 so that their combined effective area is greater than the effective area L of the piston 99. This second condition (2) immediately above is obtained by having the shuttle sufficiently long relative to the axial distance between the shoulder 147 and the lower surface of the housing member 152 so that the annular seal 102 becomes raised away from contact with the shoulder 147 when the surface M of the piston 99 abuts against the housing member 152.

In these automatic firing arrangements the operating piston 99 remains firmly seated against the static seal 115 so long as the product of the pressure in chamber 148 times the area L exceeds the product of the pressure in chamber 113 times the now greater effective area K. Consequently, so long as the pressure fluid is introduced rapidly through the fill port 90 into the operating chamber 148, then the restriction 154 causes the rise in pressure in the charge chamber 113 to lag below that in the chamber 148. The shuttle remains seated until the pressure in chamber 113 overbalances the holding force being exerted on the piston 99, at which time the repeater fires itself by moving the piston 99 away from contact with the static seal 115. Immediately, the pressure on opposite sides of the operating piston 99 approaches equilibrium and a violent acceleration of the shuttle ensues, prior to abrupt opening of the vent means 96.

After the gas charge is released, through the vents 96, the pressure in the charge chamber 113 is reduced to ambient pressure, but the pressure in the operating chamber 148 is still high. This high pressure acts upon the effective area of the piston rod 101 so as to push the shuttle quickly back to its closed position. Immediately the charge chamber 113 begins to fill again through the restricted passage 154. At the same time a supply of the high pressure fluid enters chamber 148 through the fill port 90 so as to maintain the pressure in chamber 148 while fluid is flowing therefrom through the restricted passage 154.

In this automatic firing arrangement, a constant supply pressure, e.g. 2,000 p.s.i., may be fed into the supply line 83 which is connected into the line 86 passing into the fill port 90, then the repeater automatically recycles itself over and over again without receiving any control signal except the constant pressure being supplied through the line 83, thus providing powerful acoustical impulses at frequent intervals, such as every three seconds. In order to lengthen the intervals between firing, when using a source of constant pressure, then the restricted passage 154 is made smaller so that there is a greater lag in time before the pressure in the charge chamber 113 overbalances the holding force being exerted by the pressure in the operating chamber 148, and vice versa.

It is to be understood that all of the foregoing systems are adapted to be used for making surveys from aircraft, including lighter-than-air craft of the types that are capable of hovering and of moving slowly over a body of water. The seismic sound impulse generator repeater apparatus 23 (FIGURE 1) and the hydrophone apparatus 24 are lowered from the aircraft to a desired depth in the water, and the high pressure fluid such as compressed air and control signals are supplied from the aircraft. The depth may be controlled in either of two ways: (1) by controlling the length of the lines 57 and 26 and the altitude of the aircraft above the water 22, or (2) by including suitable floats which remain at the surface of the water 22, with the acoustical impulse apparatus 23 and hydrophone equipment 24 suspended in the water below these floats.

From the many illustrative embodiments of the invention described above it will be appreciated that it is desirable to make the shuttle as light as possible commensurate with the desired strength and durability so as to achieve a very high velocity during its acceleration along the acceleration path before the vents are open. Consequently, high-strength, light-weight, non-corrosive metals and alloys, for example such as aluminum alloys, titanium, and the like, may be used advantageously for many applications, particularly where it is desired to use a compact device having a relatively short acceleration path length E while obtaining a high velocity. In any event, for most applications it is desirable to have an acceleration path length E at least $\frac{1}{16}$ of the diameter of the opening piston so as to assure a very abrupt release of the charge of high pressure fluid.

In all of the embodiments described the shuttle is fully released after it has moved an initial very slight distance of the order of a few thousandths of an inch so that thereafter the shuttle accelerates freely along the acceleration path.

As used herein the terms "seismic exploration" and "seismic survey" are used synonymously and are intended to include any and all exploration systems or processes wherein acoustical impulses, sounds, vibrations, tremors, and similar physical movements, oscilaltions and vibrations of water and/or of geological formations are used to provide information about portions of the earth or bodies of water, or both.

From the foregoing it will be understood that the illustrative embodiments of the powerful sound impulse generation methods and apparatus and seismic exploration systems of the present invention described above are well suited to provide the advantages set forth, and since many possible embodiments may be made of the various features of this invention and as the methods and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of these embodiments may be used without a corresponding use of other features, all without departing from the scope of the invention.

What is claimed is:

1. A method for seismic exploration of sub-bottom formations beneath bodies of water comprising the cyclical steps of compressing air, feeding the compressed air down beneath the surface of the body of water, confining the compressed air under high pressure in a confined volume beneath the surface of the water, excluding the high pressure compressed air from a confined region, producing a sequence of electrical signals at accurately timed intervals, releasing compressed air into said confined region in response to an electrical signal of said sequence for suddenly releasing the confined compressed air into the water generating a powerful acoustical impulse in the water in response to said electrical signal, applying the pressure of compressed air for closing said confined volume after the compressed air has been suddenly released, repeating said steps of confining the compressed air under high pressure in said confined volume beneath the surface of the water, excluding the high pressure compressed air from said confined region, and of releasing compressed air into said confined region in response to an electrical signal of said sequence for suddenly releasing the confined compressed air into the water generating another powerful acoustical impulse in the water in response to said electrical signal and of applying the pressure of compressed air for closing said confined volume for emitting powerful acoustical pulses into the water at accurately timed intervals, sensing the portions of said cyclically repeated acoustical pulses which are reflected from the sub-bottom formations and which travel up through the water toward the surface of the water, and recording information from said sensed portions of said reflected acoustical pulses.

2. A method for seismic exploration of sub-bottom formations beneath bodies of water comprising the steps of producing electrical signals at spaced predetermined intervals, compressing air, feeding the compressed air down beneath the surface of a body of water, confining the compressed air under pressure beneath the surface of the water at a pressure in excess of the pressure of the water surrounding the confined air, mixing fuel with said confined air, burning said fuel, confining the burning mixture in a closed volume greatly raising the pressure of the confined gas products of combustion, in response to one of said electrical signals abruptly releasing the high pressure gas products from said closed volume directly into the water beneath the surface of the water for emitting a powerful acoustical pulse into the water, using the pressure of the compressed air for reclosing said closed volume, again confining air under pressure beneath the surface of the water in said closed volume at a pressure in excess of the pressure of the water surrounding the confined air, mixing fuel with said latter confined air, burning said latter fuel, again confining the burning mixture in said closed volume greatly raising the pressure of the confined gas products of combustion, in response to another one of said electrical signals, again abruptly releasing the high pressure gas products from said closed volume directly into the water beneath the surface of the water and at a predetermined timed interval subsequent to said first abrupt release for emitting a second powerful acoustical pulse into the water, cyclically repeating said steps at predetermined timed intervals for emitting a sequence of powerful acoustical pulses into the water at predetermined timed intervals, sensing the resulting acoustical pulses which return later from the sub-bottom formations toward the surface of the water, and recording information obtained from sensing said resulting returning acoustical pulses.

3. In a system for producing underwater acoustic signals in a body of water, acoustical repeater apparatus for emitting a large amount of acoustic energy into the water in a repeatable pulse comprising container means adapted to be placed in the water for holding a charge of gas under high pressure therein, vent means for discharging the charge of high pressure gas from the container means into the water, valve means for holding said charge of high pressure gas spaced away from said vent means for retaining said charge in said container means, operating means for controlling said valve means, said operating means having surfaces facing in opposite directions, means applying gas pressure to one of said surfaces for holding said valve means in an initial position spaced away from said vent means, firing means applying gas pressure to another of said surfaces of said operating means facing effectively in the opposite direction from said one surface for releasing said valve means to begin moving from said initial position toward said vent means, said repeater apparatus including a plurality of by-pass openings providing passages for gas to flow from a region near said one surface to a region near said other surface of said operating means after said valve means begins moving toward said vent means for equalizing the pressure against said surfaces, said container means having an acceleration path along which said valve means travels while said valve means is propelled by said charge of high pressure gas as said charge moves toward said vent means for accelerating said valve means to a high velocity before said charge reaches said vent means for abruptly releasing said charge of high pressure gas into the water to emit a large amount of acoustic energy into the water, return means for applying gas pressure to said operating means for returning said valve means to said initial position spaced from said vent means, and means for providing another charge of high pressure gas in said container means in readiness to repeat the abrupt release thereof.

4. A powerful acoustical impulse generator repeater apparatus comprising container means for holding gas therein under high pressure, vent means for discharging said high pressure gas from said container means, a movable shuttle in said container means, said container means defining an acceleration path along which said shuttle may move, said vent means being closed when said shuttle is at a first position along said path and being opened when said shuttle is at a second position along said path, said shuttle being exposed to the high pressure gas to be released for applying large force to said shuttle for urging said shuttle along said path toward said second position, chamber means applying gas pressure to a first surface of said shuttle for holding said shuttle at said first position, firing means applying gas pressure to a second surface of said shuttle facing effectively in the opposite direction from said first surface for placing said shuttle in unstable equilibrium at said first position to begin the shuttle moving toward said second position, said chamber means including a by-pass opening in the wall thereof allowing gas to flow rapidly away from said first surface of said shuttle toward said second surface after said shuttle begins to move toward said second position, whereby the high pressure gas to be released accelerates said shuttle along said path to a high velocity before the shuttle reaches said second position for abruptly releasing the high pressure gas to provide a powerful acoustical impulse, and return means for applying gas pressure to said shuttle for returning said shuttle to said first position in readiness for repeating the operation thereof.

5. A method for seismic exploration of the earth's crust adjacent to bodies of water comprising the steps of compressing air, feeding the compressed air down into the water beneath its surface, confining compressed air under high pressure in a confined volume beneath the surface of the water, suddenly releasing the compressed air from said confined volume into the water for emitting a powerful acoustical pulse into the water, changing the size of said confined volume while maintaining it beneath the surface of the water, again confining compressed air under high pressure in said confined volume differing in size from that previously, suddenly releasing the latter compressed air from said confined volume of different size into the water for emitting a powerful acoustical pulse into the water having frequently characteristics differing from those of the previous pulse.

6. A method for seismic exploration of the earth's crust adjacent to bodies of water comprising the steps of confining compressed air under high pressure in a confined volume submerged in a body of water, suddenly releasing the compressed air from said confined volume into the water for emitting a powerful acoustical pulse into the water, changing the volume of said confined volume while submerged, again confining compressed air under high pressure in said changed confined volume at a volume and pressure different from those previously used, suddenly releasing the latter compressed air into the water for emitting a powerful acoustical pulse into the water having characteristics differing from those of the previous pulse.

7. A powerful acoustical impulse generator repeater device for abruptly releasing a charge of high pressure gas comprising container means having an operating chamber and a charge chamber for holding said charge, vent means for discharging said charge from said charge chamber, a movable shuttle having a closing piston, an operating piston, and a piston rod extending between said pistons, said container means including first seal means cooperating with said closing piston when said shuttle is in its initial position for holding said charge in the charge chamber, sad container means defining a path of travel for said closing piston to travel in moving toward said vent means for discharging said charge after the closing piston has moved along said path to the vent means, said operating piston being located in said operating chamber and having a front surface facing into said operating chamber when the shuttle is in its initial position, fill means for introducing high-pressure gas into said operating chamber, said shuttle having a passage extending therethrough along the length of said piston rod for conducting gas from said operating chamber into said charge chamber, second seal means cooperating with said operating piston when said shuttle is in its initial position for preventing the high-pressure gas from coming in contact with the back surface of said operating piston, firing means for moving said operating piston, and by-pass means for equalizing the pressure against the front and back surfaces of said operating piston after said shuttle has moved a minute distance away from its initial position for abruptly releasing the shuttle for allowing said holding piston to travel along said path.

8. A powerful acoustical impulse generator repeater device as claimed in claim 7 providing self-actuating firing operation in which said firing means for moving said operating piston is a movable annular ring included in said first seal means, said annular ring engaging said closing piston in its initial position increasing the effective area of said closing piston whereby the pressure of the charge acting upon said increased effective area overcomes the force of the gas pressure in the operating chamber acting upon the front surface of said operating piston to move said shuttle, thereby causing said operating piston to move away from its initial position for abruptly releasing the shuttle.

9. In a system for producing underwater acoustic signals in a body of water, acoustical repeater apparatus for emitting a large amount of acoustic energy into the water in a repeatable pulse comprising container means adapted to be placed in the water for holding gas under high pressure therein, vent means for discharging the gas from the container means into the water, a plurality of piston means interconnected by a member forming a movable shuttle, a first of said piston means serving for holding the high pressure gas prior to release and initially being positioned at a distance E from said vent means, and a second of said piston means serving to control the movement of said movable shuttle, said shuttle member having a bore extending axially therein, said container means including first seal means engaging said first piston means when the shuttle is in its initial position for holding high pressure gas in said container means, said container means having a chamber therein applying high pressure gas to a first surface L of said second piston means for holding said shuttle in its initial position, said container means including second seal means engaging said second piston means when the shuttle is in its initial position preventing the high pressure gas from being applied to a second surface M of said second piston means, said container means including third sealing means engaging said shuttle member in sliding engagement therewith between said first piston means and said second piston means, said container means having a firing passage communicating with said surface M of said second piston means, an electrically actuated fire valve normally closed and preventing the passage of high pressure gas through said firing passage, an electrical firing circuit connected to said fire valve for actuating said valve to allow high pressure gas to pass through said firing passage to be applied to said second surface M thereby beginning to move said shuttle from its initial position, by-pass opening means associated with the periphery of said second piston means providing communication between said first and second surfaces L and M after said shuttle has moved from its initial position allowing said shuttle to accelerate to a high velocity as said first piston travels said distance E for abruptly releasing high pressure gas through said vent means for emitting a large amount of acoustic energy into the water, and said container means having a passage supplying high pressure gas to said axial bore as said shuttle is returned to its initial position following each firing of said acoustical repeater apparatus.

10. In a system for producing underwater acoustic signals in a body of water, acoustical repeater apparatus as claimed in claim 9 including a pedestal extending into said axial bore, said third sealing means being supported on said pedestal and being in sliding engagement with the bore of said shuttle member, and said passage supplying high pressure gas to said axial bore extending through said pedestal.

11. A powerful acoustical impulse generator repeater device for abruptly releasing pressurized gas in response to an electrical signal to provide an intense, repeatable acoustical pulse comprising container means having a charge chamber for holding gas under pressure and having an operating chamber, means for feeding gas under pressure into said charge chamber and said operating chamber, vent means to the exterior of said container means for discharging the pressurized gas from said charge chamber, first piston means for closing said vent means and having a normal position at a distance from said vent means, said first piston means having a first surface facing toward said vent means and a second surface on the opposite side of said first piston means exposed to the pressurized gas in said charge chamber for urging said first piston means to move along said distance toward said vent means, second piston means spaced from said first piston means, interconnection means extending between said first and second piston means for connecting said first and second piston means together, said second piston means having third and fourth surfaces on opposite sides thereof, said third surface effectively facing in the opposite direction from said second surface and having a larger effective area than said second surface exposed to the pressurized gas in said operating chamber for holding said first piston at its normal position, said container means including an intermediate portion thereof positioned between said first and second piston means and surrounding said interconnection means, seal means retained by said intermediate portion and encircling interconnection means in effective sliding sealing engagement with said interconnection means, said intermediate portion including a firing passage communicating with a region between said intermediate portion and said fourth surface, control means responsive to an electrical signal for applying the presurized gas through said firing passage to said region between said intermediate portion and said fourth surface for causing the equalization of the pressure of the gas in said operating chamber against said third and fourth surfaces thereby to accelerate said first piston means along said distance with very great acceleration for suddenly opening said vent means to discharge said presurized gas from said charge chamber through said vent means with an intense acoustical pulse, and the gas pressure in said operating chamber applied to said third surface moving said first and second piston means for returning said first piston means to its normal position.

12. A powerful acoustical impulse generator repeater device for abruptly releasing pressurized gas in response to an electrical signal as claimed in claim 11 in which said interconnection means extending between said first and second piston means is a hollow piston rod having a passage extending axially therethrough, said axially extending passage providing gas flow between said operating chamber and said charge chamber, said operating chamber having a fill passage communicating therewith supplying gas under pressure into said operating chamber, and said axially extending passage being constricted maintaining the pressure in said operating chamber above the pressure in the charge chamber as the charge chamber begins to fill following discharge thereof.

13. In a system for seismic surveying of geological formations beneath bodies of water, acoustical repeater apparatus adapted for repeatedly emitting abrupt powerful acoustical energy pulses into the water comprising container means adapted to be put into the water and towed from a survey craft for holding gas under high pressure, a source of compressed air on the craft, means on the craft for producing control signals at predetermined intervals, means for introducing the compressed air into said container means, as it is being towed from the craft, means for introducing fuel into said container means as it is being towed from the craft and for mixing the fuel with the compressed air therein and for burning said fuel therein, confining means positionable in an initial position confining the gas products of combustion in a fixed volume in said container means during burning of the fuel for greatly raising the pressure of the confined gas products of combustion, firing means responsive to said control signals for suddenly releasing said confining means from its initial position allowing very great acceleration of said confining means into a second position for abruptly discharging the high pressure gas products of combustion directly into water to emit an abrupt powerful acoustical energy pulse into the water, said container means including an operating chamber communicating with said confining means, and means for introducing compressed air into said operating chamber, the compressed air in said operating chamber applying force to said confining means returning said confining means from said second position to its initial position following release of the high pressure gas products.

14. Underwater acoustical impulse generator repeater apparatus for repeatedly emitting acoustical impulses into a body of water for seismic exploration of the earth adjacent to the body of water comprising container means including a first chamber for holding gas under high pressure; means for suddenly releasing the high pressure gas from said chamber including vent means to the exterior of said container means, a cylinder surface extending for a distance away from said vent means, movable piston means for suddenly opening said vent means in response to an electrical signal, said movable piston means having a first piston in sliding engagement with said cylinder surface for closing said chamber and initially positioned at a distance from said vent means, said first piston having a first effective area exposed to the pressure of the gas in said chamber urging said first piston to accelerate along said cylinder surface toward said vent means, said container means including a second chamber spaced from said first chamber, said vent means being positioned intermediate said first and second chambers, a second piston spaced from said first piston, said second piston being located in said second chamber, rigid interconnection means extending between said first and second piston for rigidly securing them together, said container means including an intermediate structure surrounding said rigid interconnection means, seal means retained by said intermediate structure, said seal means surrounding said rigid interconnection means and being in effective sliding sealing relationship with said interconnection means, said second piston having a second effective area which is larger than said first effective area of said first piston and which is exposed to the pressure of the gas in said second chamber and which faces in the opposite direction from said first effective area for holding said first piston in its initial position at said distance away from said vent means, firing means for applying pressure to the opposite side of said second piston from said second effective area in response to an electrical signal for releasing said movable piston means for very great acceleration as said first piston travels along said cylinder surface toward said vent means for suddenly releasing said high pressure gas when said vent means is abruptly opened after said very great acceleration has occurred, thereby to emit an acoustical impulse into the water, said first piston having a stop surface of substantial area on the opposite side thereof from said first effective area exposed to the water and said intermediate structure having a stop surface exposed to the water and in opposed relationship to the stop surface of said first piston for decelerating said movable piston means by forcing the water out from between said stop surfaces through said vent means as said stop surfaces approach each other, said second chamber applying gas pressure to said second effective area providing a net thrust on the projected area surrounded by said seal means for returning said movable piston means to the initial position, and means for refilling said first chamber with high pressure gas for repeating the operation.

15. A pressure gas operated acoustical pulse wave-producing repeater device for seismic exploration of the world's crust under bodies of water comprising a container adapted to be placed in a body of water, supply means for feeding gas under pressure into said container including a charge chamber having a discharge port leading from the interior of said chamber, a vent leading to the exterior of said container and a cylinder extending from said port to said vent for providing an escape path for the gas to escape from said chamber through said port, along said cylinder and out of said vent, first piston means reciprocating within said cylinder between said port and said vent, said discharge port being defined by a movable seal of a tough durable material, said movable seal encircling the discharge port and engaging against said first piston means near the periphery of said first piston means when said first piston means is positioned adjacent to said port, spring means urging said movable seal toward said first piston means, resilient sealing means providing a sliding seal between said movable seal and said container, second piston means spaced from and connected to said first piston means and subject to the pressure within said container, said second piston means having a larger effective area than said first piston means for normally holding said first piston means adjacent to said port with said first piston means engaging said movable seal for blocking said port, gas conducting means providing a path for flow of gas from one side to the other side of said second piston means, valve means for opening said gas conducting means to equalize the pressure on opposite sides of said second piston means for permitting the gas pressure to impart very great acceleration to said first piston means in moving along said cylinder from said port to said vent for suddenly releasing said gas through said vent to emit a large amount of acoustical energy into the water in the form of a clean, repeatable pulse, and gas pressure in said container returning said first piston means to its initial position adjacent to said port engaging said movable seal for again blocking said port.

16. A pressure gas operated acoustical wave-producing system for seismic exploration of formations beneath a body of water comprising a towing chassis adapted to be towed from a moving vessel, said chassis having tail fins for stabilizing the chassis when the chassis is being towed through the water, a towing cable for towing said chassis, a container device carried by said chassis and being submerged in the water during towing of the chassis, means for supplying gas to said container device and for operating said device including a compressor on the vessel, a flexible line extending from said compressor for supplying gas under pressure into said container device, said container device having a discharge port leading from the interior of said container device, a first sealing element mounted in said container device near said port, a vent leading to the exterior of said container device and a cylinder extending between said port and vent, first piston means reciprocating within said cylinder between said port and said vent, second piston means connected to and spaced from said first piston means, said first and second piston means moving together in an axial direction, said first piston means abutting against said first sealing element at the limit of its movement toward said port for closing said port, and said second piston means being subject to the pressure within said container device, said second piston means having a larger effective area than said first piston means for normally holding said first piston means adjacent to the said port abutting said first sealing element for blocking said port, a second sealing element mounted in said container device, said second piston means abutting against said second sealing element when said first piston means is abutting against said first sealing element, a solenoid-operated valve adjacent to said container device for initiating a flow of gas from one side to the other side of said second piston means to equalize the pressure on opposite sides of said second piston means for releasing said first piston means with very great acceleration toward said vent, thereby suddenly to release the compressed gas when said first piston means reaches said vent, and an electric wire extending from said vessel connected to said solenoid-operated valve for firing said device as it is being towed through the water.

17. A gas operated acoustical pulse wave-producing device for seismic exploration of the world's crust under bodies of water comprising a container adapted to be placed in a body of water, a compressor and a flexible line extending from said compressor for supplying compressed air into said container, said container having a charge chamber, a discharge port at the outlet from said charge chamber, a movable annular sealing element surrounding said port, said movable annular element being made of metal to resist heat, a resilient sealing member providing a sliding seal between said movable annular metal element and said container, wall means defining a cylindrical surface extending from said port and having vent means therein spaced from said port, first piston means sliding within said cylindrical surface, said cylindrical surface defining a passage for gas to escape from said discharge chamber through said port and out through said vent means from said container, second piston means spaced from and connected to said first piston means and forming a high-velocity shuttle, said second piston means being subject to the pressure within said container, said second piston means having a larger effective area than said first piston means for normally holding said first piston means in an initial position within said cylindrical surface adjacent to said movable annular metal element, spring means urging said movable element against said first piston means when said first piston means is in said initial position for blocking said port, fuel injecting means for injecting fuel into said chamber after compressed air has been supplied into said chamber, igniting means for igniting said fuel for combustion within said chamber, means for applying the pressure on opposite sides of said second piston means to release said first and second piston means, when said applying means is actuated, whereby said first piston means slides along said cylindrical surface with great acceleration for abrutly opening said vent means and emits a large amount of acoustical energy into the water in the form of a clean, repeatable pulse, and means applying pressure to said shuttle returning said first gas piston means to said initial position adjacent said movable annular element for again blocking said port.

18. In a system for producing acoustical signals in a body of water, acoustical repeater apparatus for emitting a large amount of acoustical energy into the water in a repeatable pulse signal of adjustable frequency characteristics comprising container means adapted to be placed in the water for holding gas under high pressure therein, vent means for discharging the gas from the container means into the water, valve means for closing said vent means and adapted to be accelerated before opening said vent means for suddenly discharging said high pressure gas from the container means into the water to emit an acoustical pulse signal, closing means applying gas pressure to said valve means for reclosing said valve means, feeding means for refilling said container means for repeated operation, and remotely controllable adjustable volume means for changing the effective volume of said container means for changing the frequency characteristics of the acoustical pulse signals produced thereby.

19. A sound impulse generator including a quick high-pressure gas release means comprising a container having a first and a second chamber; piston means separating said first and said second chamber; means for introducing gas at high pressure into said first chamber to urge said piston means toward said second chamber; valve means connected to said piston means and controlled thereby for opening said first chamber for abruptly releasing the gas therefrom; means for introducing high-pressure gas into said second chamber thereby to increase the pressure in said second chamber for abruptly releasing said valve means to begin moving; a plurality of by-pass openings admitting the pressure to opposite sides of said piston means after said valve means begins moving for increasing the acceleration of said valve means and remotely controllable adjustable piston means for varying the effective volume of said first chamber for adjusting the characteristics of the sound impulses generated upon the abrupt release of the gas therefrom.

20. In a system for producing acoustical pulses in a body of water, acoustical repeater apparatus for emitting powerful acoustical pulses into the body of water comprising container means including a plurality of axially aligned cylinders each having a piston in sliding engagement therewith, a first of said cylinders having sealing means adjacent to one end thereof, a first piston in sliding engagement with said first cylinder engageable with said sealing means for confining gas in said container means at high pressure, said first cylinder having vent means to the exterior thereof communicating with the opposite end of said first cylinder from said sealing means, a second of said cylinders having second sealing means, a second piston in sliding engagement with said second cylinder and engageable with said second sealing means for controlling the movement of the first piston, piston rod means rigidly interconnecting said pistons for simultaneous movement thereof, means for feeding gas at high pressure into said second cylinder applying pressure to a side L of said second piston for holding said second piston in engagement with said second sealing means for holding said first piston in engagement with said first sealing means, thereby to confine said gas at high pressure, and firing means for introducing high pressure gas against the opposite side M of said second piston for equalizing the pressure against the sides L and M for suddenly releasing said first piston for very great acceleration along said first cylinder toward said vent means for abruptly releasing the high pressure gas from said container means, and means for returning said first and second pistons into engagement with said first and second sealing means, respectively.

21. A pneumatic acoustical wave-producing device having an effective chamber volume which is remotely controllable for controlling the acoustical waves produced, said device comprising a container; means for feeding fluid under pressure to said container; means for instantaneously releasing said pressure fluid from said container, said instantaneous releasing means comprising piston means normally closing an exhaust port leading from the interior to the exterior of said container; means connected to said piston means and subjected to the pressure fluid within said container for operating said piston means; said container having a chamber therein for holding the pressure fluid to be released, a volume adjusting cylinder communicating with said chamber, a movable piston within said cylinder, hydraulic liquid within said cylinder behind said movable piston, a control cylinder having a control piston therein, said control cylinder having hydraulic liquid therein in front of said control piston, a hydraulic line communicating with the region in front of said control piston and behind said movable piston, and control means for moving said control piston, thereby to displace the hydraulic liquid for moving the piston in the volume adjusting cylinder to adjust the effective chamber volume for remotely controlling the characteristics of the acoustical waves produced.

22. A powerful acoustical impulse generator repeater apparatus comprising container means for holding gas therein under high pressure, vent means for discharging said high pressure gas from said container means, a movable shuttle in said container means, said container means defining an acceleration path along which said shuttle may move, said vent means being closed when said shuttle is at a first position along said path and being opened when said shuttle is at a second position along said path, said shuttle being exposed to the high pressure gas to be released for applying large force to said shuttle for urging said shuttle along said path toward said second position, firing means for placing said shuttle in unstable equilibrium at said first position, whereby the high pressure gas to be released accelerates said shuttle along said path to a high velocity before the shuttle reaches said second position for abruptly releasing the high pressure gas to provide a powerful acoustical impulse, and means for turning said shuttle about its axis into different angular positions with respect to the container means for equalizing the wear of the shuttle along said acceleration path.

23. An automatic powerful acoustical impulse generator repeater device for repeatedly abruptly releasing a charge of high pressure gas comprising container means having an operating chamber and a charge chamber for holding said charge, vent means for discharging said charge from said charge chamber, a movable shuttle having a closing piston, an operating piston, and a piston rod extending between said pistons, said shuttle being movable into an initial position, said container means including first seal means acting with said closing piston when said shuttle is in its initial position for holding said charge in the charge chamber, said container means defining a path of travel for said closing piston to travel in moving toward said vent means for discharging said charge after the closing piston has moved along said path to the vent means, said operating piston being located in said operating chamber and having a front surface facing into said operating chamber when the shuttle is in its initial position, fill means for introducing high-pressure gas into said operating chamber when the shuttle is in its initial position, said shuttle having a passage extending therethrough along the length of said piston rod for conducting gas from said operating chamber into said charge chamber, second seal means cooperating with said operating piston when said shuttle is in its initial position for preventing the high-pressure gas from coming in contact with the back surface of said operating piston, said closing piston and first seal means defining a larger effective area exposed to said charge than the effective area of the front surface of said operating piston for moving said shuttle when the force of the charge overbalances the force of the high-pressure gas in the operating chamber, and by-pass means for equalizing the pressure against the front and back surfaces of said operating piston after said shuttle has moved a small distance away from its initial position for abruptly releasing the shuttle for allowing said holding piston to travel along said path with great acceleration.

24. An acoustical repeater device for abruptly releasing a charge of high pressure gas comprising container means for holding the charge, vent means for discharging the charge from the container, seal means, a movable shuttle engageable with said seal means for holding the charge in said container, a cylindrical wall extending adjacent to a portion of said movable shuttle along the path of movement of said shuttle means, and means for completely releasing said shuttle for rapid acceleration upon separation of said seal means and shuttle for allowing great acceleration of said shuttle for abruptly releasing the charge, said means for completely releasing said shuttle including a plurality of lands formed by the cylinder wall defining a plurality of by-pass openings between said lands permitting high pressure gas to flow through said by-pass openings from one side to the other of said portion of the shuttle after said shuttle has separated from said seal means.

25. A method for seismic exploration of sub-bottom geological formations and strata beneath a body of water comprising the steps of submerging a rigid container in the body of water directly surrounding the container, moving said rigid container along a path while submerged in the water, compressing air, feeding the compressed air down to said container while said container moves along the submerged path, applying the pressure of compressed air for closing said container, confining compressed air under high pressure in said closed moving submerged container, producing electrical signals in sequence at intervals, releasing a quantity of compressed air in response to one of the electrical signals of said sequence to open said container for abruptly releasing said compressed air from said container directly into the surrounding water generating powerful, well-defined acoustical waves in the water, applying the pressure of compressed air for reclosing said moving submerged container, confining compressed air under high pressure in said re-closed container, releasing another quantity of compressed air in response to a subsequent signal of said sequence to re-open said container for again abruptly releasing said compressed air from said container directly into the surrounding water again generating powerful well-defined acoustical waves in the water, repeating said steps of re-closing, confining and releasing, generating a sequence of powerful well-defined acoustical waves at intervals in the water corresponding to said sequence of electrical signals, sensing portions of said sequence of acoustical waves which are subsequently reflected from the sub-bottom geological formations and strata and which later travel up through the water toward the surface of the water, and electrically recording information obtained from the sensed portions of said sequence of acoustical waves.

26. Powerful acoustical impulse generator apparatus comprising container means for holding gas therein under high pressure, said container means having a large vent, a plurality of piston means in said container means and a rigid member interconnecting said piston means forming a movable shuttle, a first of said piston means being positionable in an initial position spaced inwardly from said vent retaining the high pressure gas in said container means, a second of said piston means being exposed to the pressure of gas in said container means for controlling the movement of said movable shuttle, said shuttle member having an axially extending passageway therein, means for introducing high pressure gas into said container means, said axially extending passageway in said shuttle member communicating with said high pressure gas for conducting said high pressure gas from one chamber in said container means to a second chamber therein for introducing high pressure gas into said second chamber, and means for accelerating said movable shuttle at high speed to move said first piston means toward said open vent for abruptly discharging high pressure gas from said large vent to generate a powerful acoustical impulse.

27. A seismic exploration system for making surveys of sub-bottom formations beneath bodies of water using a vessel travelling over the body of water and utilizing an air compressor on the vessel for supplying compressed air, said system including a rigid container adapted to be submerged and to be towed from the ship, said container having a charge chamber, a compressed air line for feeding compressed air from the compressor to said rigid container for confining the compressed air in said charge chamber, said container having a large vent for discharging the compressed air directly into the water, a release member within said container acceleratable from an initial position toward said vent and suddenly discharging the compressed air after the release member has reached said vent, compressed air return means for returning the release member to its initial position, following each discharge of said charge chamber, said release member having a passage therein communicating with said charge chamber for conducting compressed air into said charge chamber following return of said release member to its initial position, solenoid valve means attached to said container means for controlling said release member, electrical control means adapted to be carried on the vessel for providing electrical signals at spaced intervals, and circuit means connecting said control means to said solenoid valve for actuating said solenoid valve in response to said electrical signals for generating powerful acoustical waves in the water by the abrupt release of compressed air through said vent at spaced intervals in accordance with said signals.

28. In a seismic exploration system for making surveys of formations beneath bodies of water using a vessel travelling over the body of water with an air compressor source on board the vessel for supplying compressed air, a powerful seismic sound source for repeatedly generating intense acoustical waves in the water including a chassis unit adapted to be towed from the vessel, said towing chassis unit having a tail boom with tail fins thereon for stabilizing the chassis unit as it is being towed through the water, acoustical repeater apparatus carried by said chassis unit, said repeater apparatus being submerged in the water as said chassis unit is being towed, a flexible air line adapted to be connected from said compressed air source to said repeater apparatus for supplying compressed air thereto, said repeater apparatus including container means having a generally cylindrical configuration, said container means having a plurality of large vents in the wall thereof, movable shuttle means within said container means initially positionable at a distance from said vents and acceleratable toward said vents for abruptly discharging compressed air through said vents into the water upon reaching said vents to produce said intense acoustical waves in the water, a firing solenoid valve connected to one end of said container means, an electrical circuit connected to said solenoid valve for controlling said valve for starting the acceleration of said shuttle means toward said vents, and compressed air return means for returning said shuttle means to its initial position following discharge of said container means in preparation for repeating the abrupt discharge of compressed air.

References Cited

UNITED STATES PATENTS

| | | | |
|---|---|---|---|
| 2,994,397 | 8/1961 | Huckabay | 181—.5 |
| 3,056,104 | 9/1962 | Dekanski et al. | 181—.5 |
| 3,062,315 | 11/1962 | Herzog | 181—.5 |
| 3,100,446 | 8/1963 | Foster | 102—25 |
| 3,111,087 | 11/1963 | Frost et al. | 102—25 |
| 3,176,787 | 4/1965 | Roever | 181—.5 |
| 1,500,243 | 7/1924 | Hammond | 181—.5 |
| 2,986,120 | 5/1961 | Murek | 91—29 |
| 3,039,559 | 6/1962 | Ellsworth | 181—.5 |
| 3,077,944 | 2/1963 | Padberg | 181—.5 |
| 3,093,117 | 6/1963 | Brown | 91—25 |
| 3,249,177 | 5/1966 | Chelminski | 181—.5 |
| 3,276,534 | 10/1966 | Ewing et al. | 181—.5 |
| 3,283,294 | 11/1966 | Schrom | 181—.5 X |
| 3,289,784 | 12/1966 | Cassand et al. | 181—.5 |
| 3,310,128 | 3/1967 | Chelminski | 181—.5 |
| 3,307,285 | 3/1967 | Wells | 340—3 |
| 3,322,232 | 5/1967 | Chalmers et al. | 181—.5 |

BENJAMIN A. BORCHELT, *Primary Examiner.*

W. KUJAMA, *Assistant Examiner.*

REEXAMINATION CERTIFICATE (1382nd)

United States Patent [19]
Chelminski

[11] B1 3,379,273
[45] Certificate Issued Nov. 13, 1990

[54] POWERFUL SOUND IMPULSE GENERATION METHODS AND APPARATUS

[75] Inventor: Stephen V. Chelminski, Redding, Conn.

[73] Assignee: Bolt Technology Corporation

Reexamination Request:
No. 90/000,465, Oct. 31, 1983

Reexamination Certificate for:
Patent No.: 3,379,273
Issued: Apr. 23, 1968
Appl. No.: 322,677
Filed: Nov. 12, 1963

Related U.S. Application Data

[63] Continuation-in-part of Ser. No. 151,853, Nov. 13, 1961.

[51] Int. Cl.$^5$ .......................... G01V 1/36; G01V 1/06
[52] U.S. Cl. .................... 367/144; 181/111; 181/120
[58] Field of Search ................ 367/23, 144; 181/106, 181/110, 113, 114, 118, 120; 102/224, 226; 175/1, 50

[56] References Cited

U.S. PATENT DOCUMENTS

| | | |
|---|---|---|
| 1,689,574 | 10/1928 | Williams . |
| 2,771,032 | 11/1956 | Callahan ........................ 102/25 |
| 3,039,292 | 6/1962 | Ottestad et al. ...................... 73/12 |
| 3,039,439 | 6/1962 | Murek ................................ 121/38 |
| 3,249,177 | 5/1966 | Chelminski ........................ 181/5 |

OTHER PUBLICATIONS

Roger Zaunere & John Ewing, Seismic Sound Sources (MK-1), Jul. 1963.
Roger Zaunere & John Ewing, Seismic Sound Sources (MK-2) Jul. 1963.

Primary Examiner—Nelson Moskowitz

[57] ABSTRACT

Methods and systems generating and utilizing powerful acoustical waves produced underwater, useful for reflection or refraction types of seismic surveys or for combinations of these. Compressed air fed to acoustical impulse generator apparatus is confined therein, electrical signals produced for firing to suddenly release the confined compressed air generating powerful acoustical waves. The pressure of compressed air is applied for re-closing the confined volume, to confine air again to repeat the sudden release; the amplitude and frequency spectrum characteristics of the acoustical waves may be varied; and in certain embodiments fuel is burned in the confined air, raising the pressure before release. Various embodiments of high-velocity shuttle configurations, pneumatic shuttle-return means, by-pass passages, seals, movable spring-biased seals, valve means, shapes of discharge vents, chamber arrangements, and electrical firing circuits are shown. Automatic firing arrangements are disclosed for self-firing without electrical signals, and a towing chassis unit with tail boom and fins is disclosed.

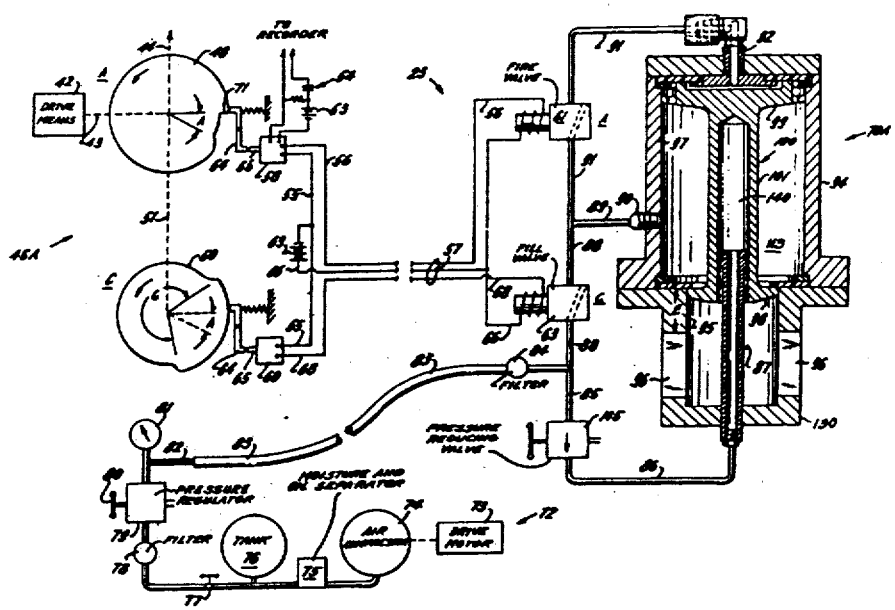

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-28 is confirmed.

* * * * *